(12) United States Patent
Kim et al.

(10) Patent No.: US 9,674,835 B2
(45) Date of Patent: Jun. 6, 2017

(54) METHOD AND DEVICE FOR TRANSMITTING RECEPTION ACKNOWLEDGEMENT INFORMATION IN A MOBILE COMMUNICATION SYSTEM

(75) Inventors: Hakseong Kim, Anyang-si (KR); Hanbyul Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 135 days.

(21) Appl. No.: 14/110,844

(22) PCT Filed: Apr. 9, 2012

(86) PCT No.: PCT/KR2012/002676
§ 371 (c)(1),
(2), (4) Date: Oct. 9, 2013

(87) PCT Pub. No.: WO2012/141462
PCT Pub. Date: Oct. 18, 2012

(65) Prior Publication Data
US 2014/0036889 A1    Feb. 6, 2014

Related U.S. Application Data

(60) Provisional application No. 61/474,259, filed on Apr. 11, 2011, provisional application No. 61/745,655, filed on Apr. 14, 2011.

(51) Int. Cl.
*H04L 5/00* (2006.01)
*H04L 1/18* (2006.01)
(Continued)

(52) U.S. Cl.
CPC ....... *H04W 72/0446* (2013.01); *H04L 1/1854* (2013.01); *H04L 5/001* (2013.01);
(Continued)

(58) Field of Classification Search
CPC . H04W 36/06; H04W 48/16; H04W 72/0453; H04W 24/00; H04W 8/24;
(Continued)

(56) References Cited

U.S. PATENT DOCUMENTS

2011/0280164 A1* 11/2011 Luo .......................... H04L 5/001
370/281
2012/0113827 A1*  5/2012 Yamada ................ H04L 1/0031
370/252

FOREIGN PATENT DOCUMENTS

| WO | WO 2010/123303 A2 | 10/2010 | |
|---|---|---|---|
| WO | WO 2012078565 A1 * | 6/2012 | ............. H04L 5/001 |
| WO | WO 2012094151 A2 * | 7/2012 | ........... H04B 7/0689 |

OTHER PUBLICATIONS

Motorola, "Control Channel Design Issues for Carrier Aggregation in LTE-A", 3GPP TSG RAN1#55, R1-084424, Nov. 10-14, 2008, pp. 1-4.

(Continued)

*Primary Examiner* — Redentor Pasia
*Assistant Examiner* — Peter Mak
(74) *Attorney, Agent, or Firm* — Birch, Stewart, Kolasch & Birch, LLP

(57) ABSTRACT

The present invention and embodiments thereof relate to a method for transmitting a signal of a base station in a wireless communication system using a carrier merge. The method includes transmitting to a terminal a Physical Downlink Shared CHannel (PDSCH) on a downlink secondary cell and a Physical Downlink Shared CHannel (PDSCH) indicating the PDSCH on a downlink primary cell; and receiving a reception acknowledgement response on the PDSCH, which is transmitted from the terminal to an uplink primary cell. The PDSCH is transmitted when the downlink secondary cell becomes available, and the transmission (Continued)

timing of the reception acknowledgement response is determined by one of the PDSCH transmission timing or the PDCCH transmission timing.

13 Claims, 27 Drawing Sheets

(51) Int. Cl.
    *H04W 72/12*     (2009.01)
    *H04L 1/00*     (2006.01)
    *H04W 72/04*     (2009.01)

(52) U.S. Cl.
    CPC .......... *H04L 5/0042* (2013.01); *H04L 1/0073* (2013.01); *H04W 72/12* (2013.01)

(58) Field of Classification Search
    CPC ............. H04W 72/0446; H04L 1/1861; H04L 1/0031; H04L 1/1671; H04L 1/1812
    USPC ........................................ 370/252, 281, 336
    See application file for complete search history.

(56) References Cited

OTHER PUBLICATIONS

Nokia, Nokia Siemens Networks, "L1 control signaling with carrier aggregation in LTE-Advanced", 3GPP TSG-RAN WG1 Meeting #54bis, R1-083730, Sep. 29-Oct. 3, 2008, pp. 1-7.

\* cited by examiner

FIG. 9
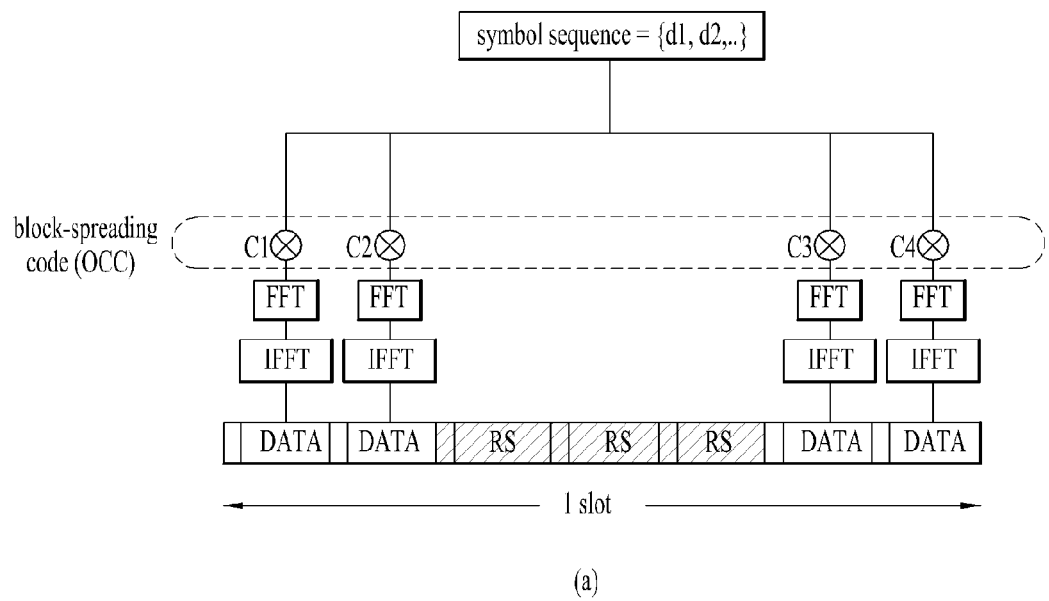
(a)
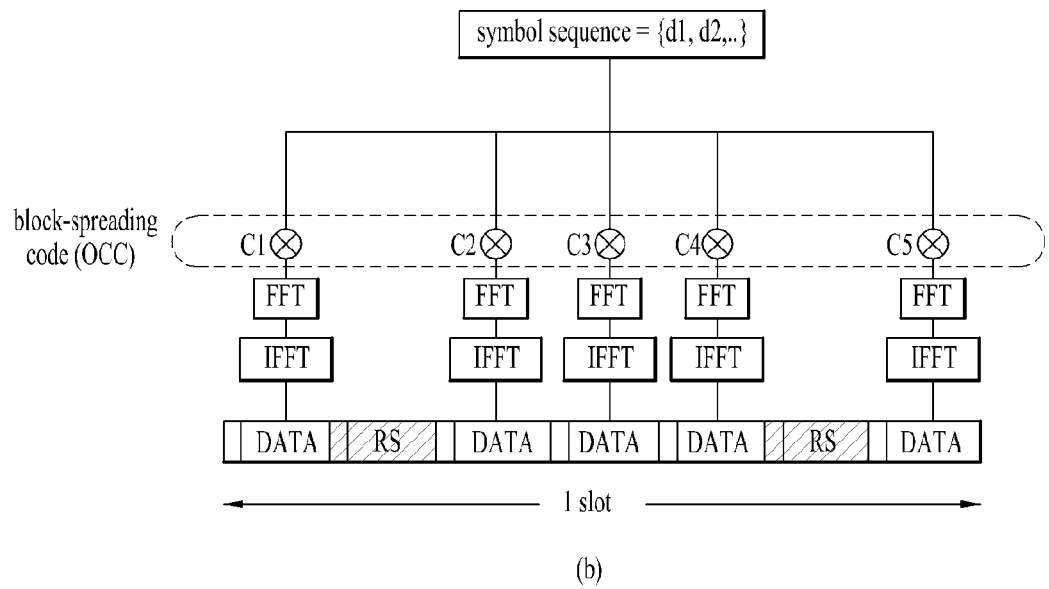
(b)

FIG. 10
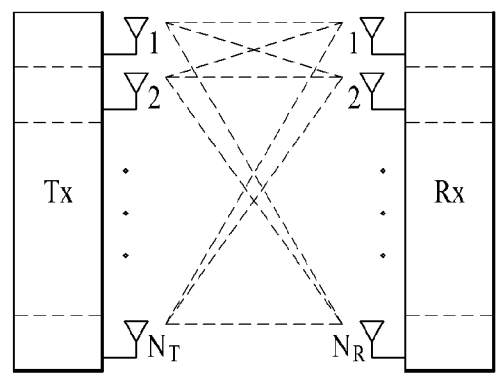
(a)
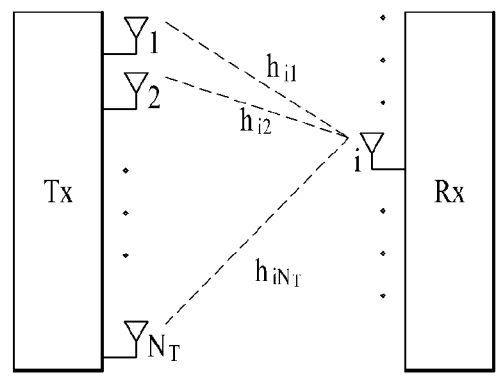
(b)

FIG. 11
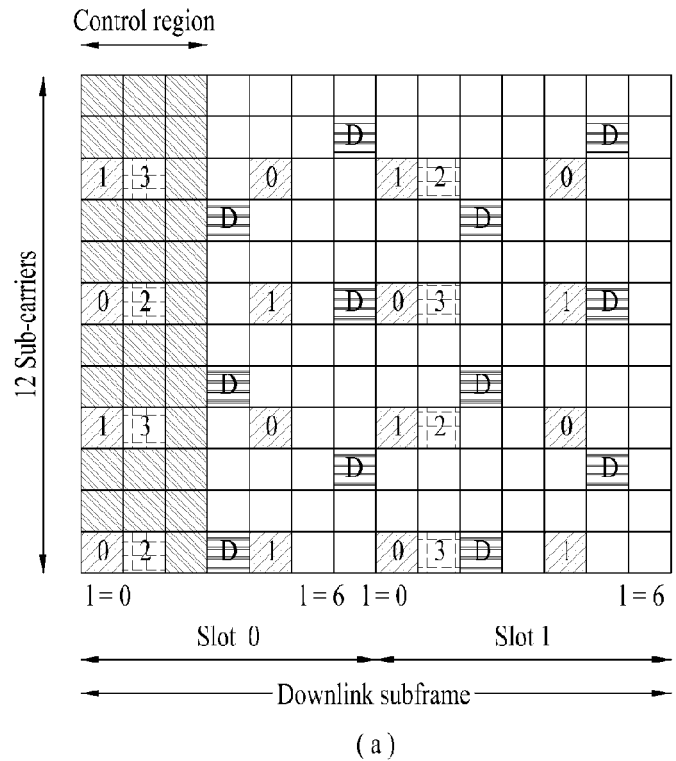
(a)
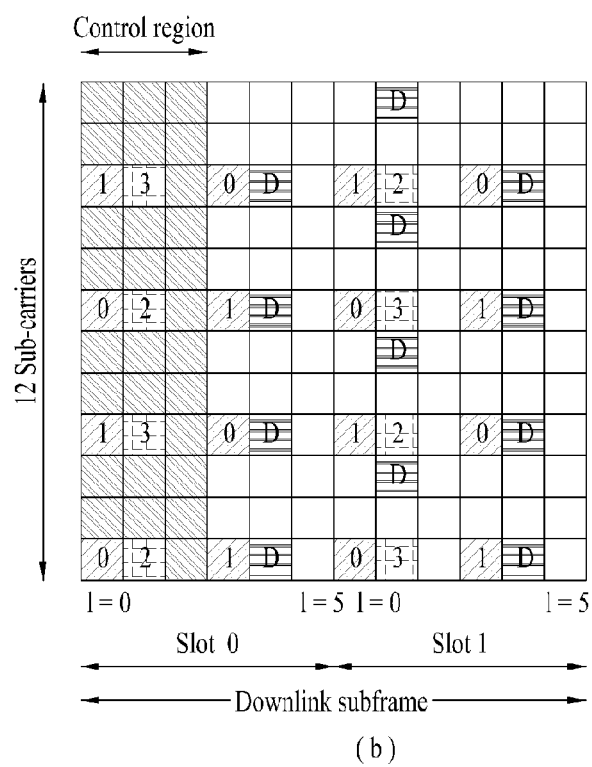
(b)

FIG. 20
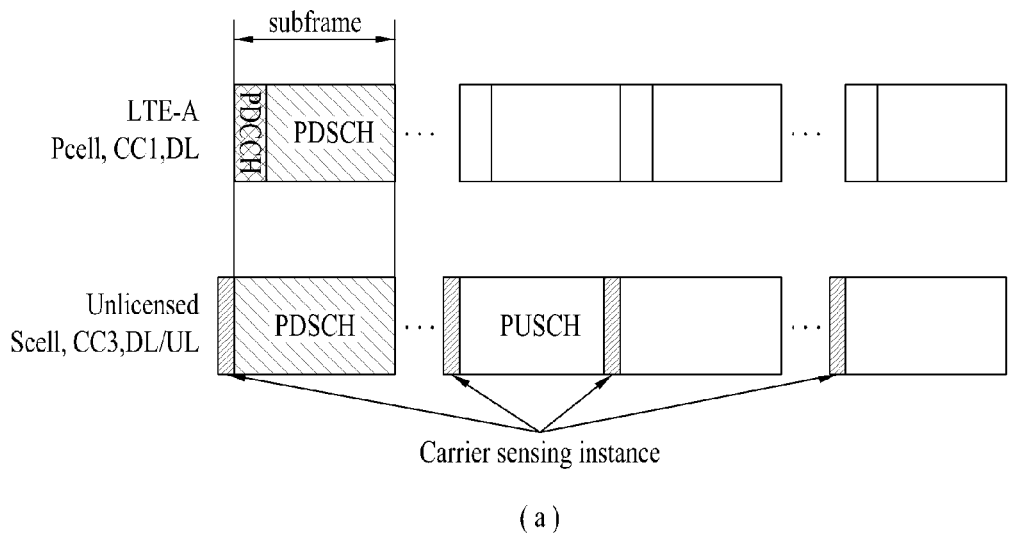
(a)
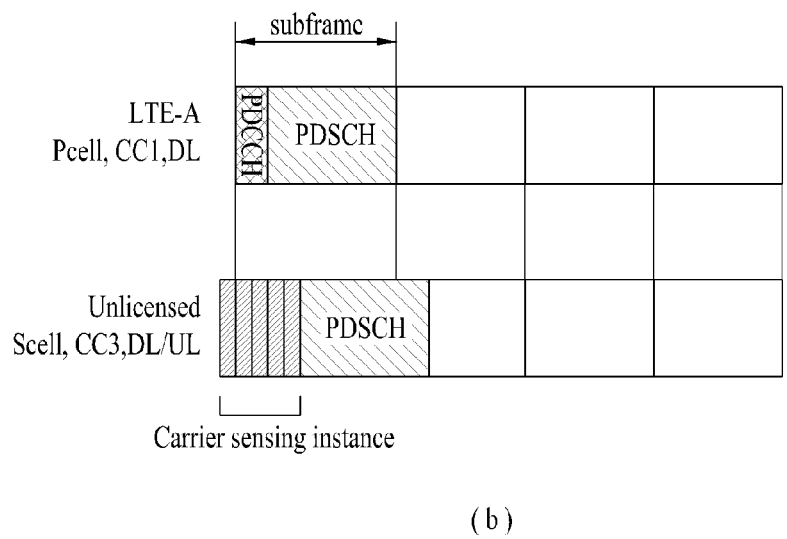
(b)

FIG. 21
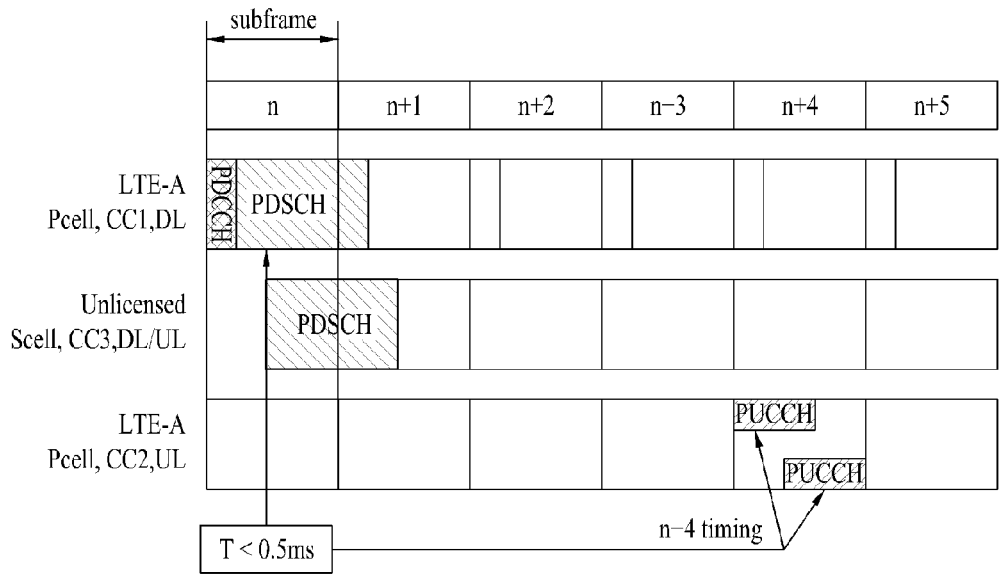
(a)
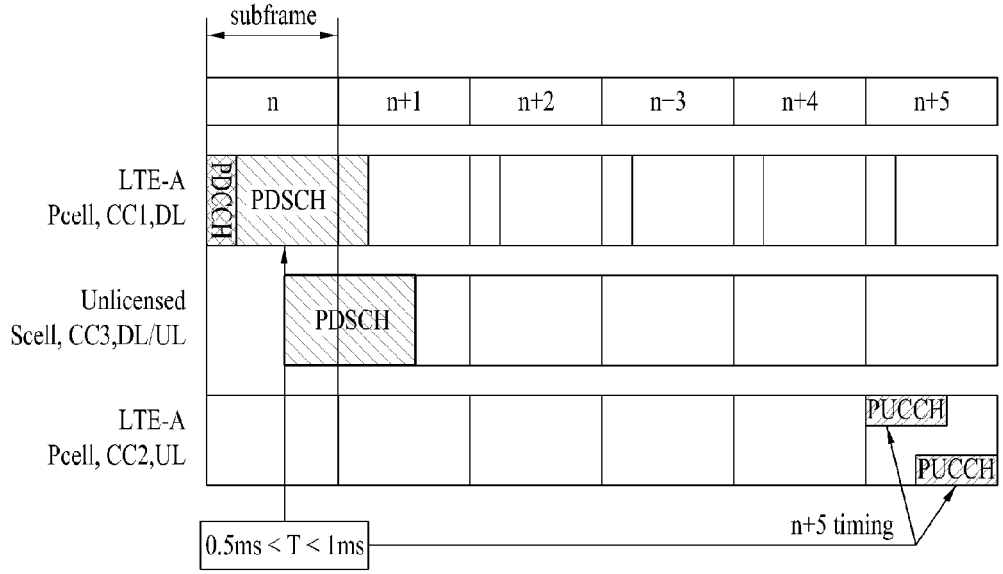
(b)

FIG. 24
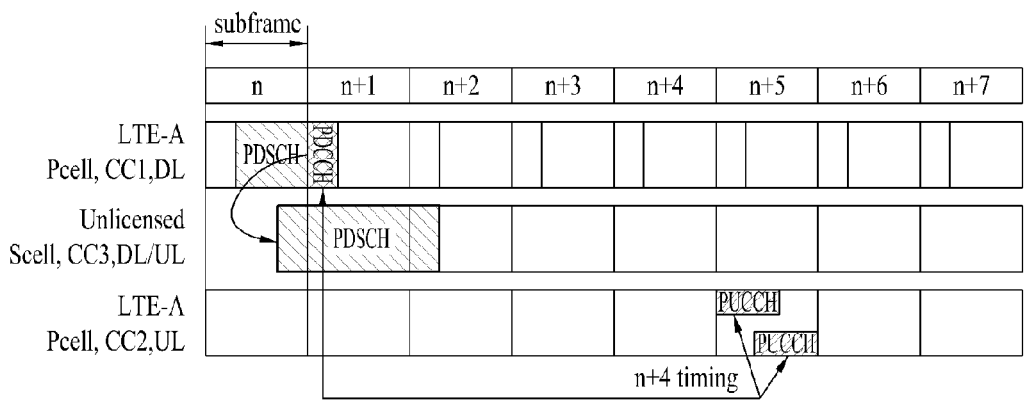
(a)
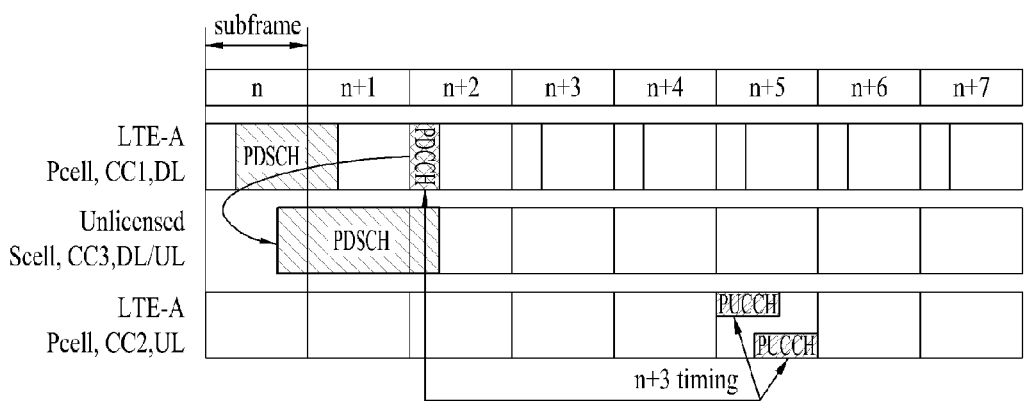
(b)
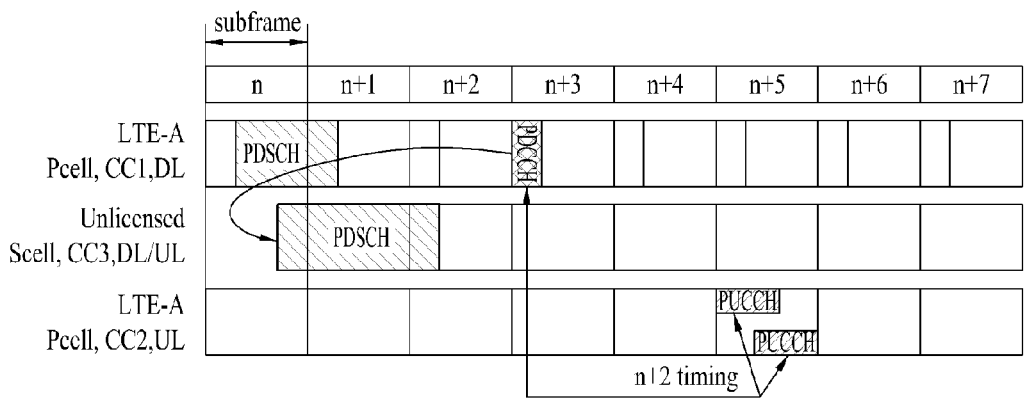
(c)

METHOD AND DEVICE FOR TRANSMITTING RECEPTION ACKNOWLEDGEMENT INFORMATION IN A MOBILE COMMUNICATION SYSTEM

This application is the National Phase of PCT/KR2012/002676 filed on Apr. 9, 2012, which claims priority under 35 U.S.C. 119(e) to U.S. Provisional Application No. 61/474,259 filed on Apr. 11, 2011 and 61/475,655 filed on Apr. 14, 2011, all which are hereby expressly incorporated by reference in to the present application.

TECHNICAL FIELD

The present invention relates to a method and device for transmitting reception acknowledgement (ACK/NACK) information in a mobile communication system.

BACKGROUND ART

Wireless communication systems have been widely used to provide various kinds of communication services such as voice or data services. Generally, a wireless communication system is a multiple access system that can communicate with multiple users by sharing available system resources (bandwidth, transmission (Tx) power, and the like). Example of multiple access systems include a code division multiple access (CDMA) system, a frequency division multiple access (FDMA) system, a time division multiple access (TDMA) system, an orthogonal frequency division multiple access (OFDMA) system, a single carrier frequency-division multiple access (SC-FDMA) system, a multi-carrier frequency division multiple access (MC-FDMA) system, and the like.

DISCLOSURE

Technical Problem

An object of the present invention devised to solve the problem lies in a method and device for transmitting reception acknowledgement (ACK/NACK) information, and in particular, to transmission timing of reception ACK when a frequency band such as an unlicensed band is included in a component carrier and is used.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

According to a first aspect of the present invention, there is provided a signal transmitting method of a base station (BS) in a wireless communication system using carrier aggregation (CA), including transmitting a physical downlink shared channel (PDSCH) in a downlink secondary cell and a physical downlink control channel (PDCCH) indicating the PDSCH in a downlink primary cell to user equipment (UE); receiving reception acknowledgement (ACK/NACK) to the PDSCH, transmitted in an uplink primary cell, from the UE, wherein the PDSCH is transmitted from a point of time when the downlink secondary cell is available, and wherein transmission timing of the ACK/NACK is determined according to any one of PDSCH transmission timing and the PDCCH transmission timing.

According to a second aspect of the present invention, there is provided a signal receiving method of user equipment (UE) in a wireless communication system using carrier aggregation (CA), including receiving a physical downlink shared channel (PDSCH) in a downlink secondary cell and a physical downlink control channel (PDCCH) indicating the PDSCH in a downlink primary cell, and transmitting reception acknowledgement (ACK/NACK) to the PDSCH in an uplink primary cell, wherein the PDSCH is transmitted from a point of time when the downlink secondary cell is available, and wherein transmission timing of the ACK/NACK is determined according to any one of PDSCH reception timing and PDCCH reception timing.

According to a third aspect of the present invention, there is provided a base station (BS) apparatus in a wireless communication system using carrier aggregation (CA), including a transmission module and a processor, wherein the processor transmits a physical downlink shared channel (PDSCH) in a downlink secondary cell and a physical downlink control channel (PDCCH) indicating the PDSCH in a downlink primary cell to user equipment (UE) and receives reception acknowledgement (ACK/NACK) to the PDSCH, transmitted in an uplink primary cell, from the UE, wherein the PDSCH is transmitted from a point of time when the downlink secondary cell is available, and wherein transmission timing of the ACK/NACK is determined according to any one of PDSCH transmission timing and the PDCCH transmission timing.

According to a fourth aspect of the present invention, there is provided a user equipment (UE) apparatus in a wireless communication system using carrier aggregation (CA), including a reception module and a processor, wherein the processor receives a physical downlink shared channel (PDSCH) in a downlink secondary cell and a physical downlink control channel (PDCCH) indicating the PDSCH in a downlink primary cell and transmits reception acknowledgement (ACK/NACK) to the PDSCH in an uplink primary cell, wherein the PDSCH is transmitted from a point of time when the downlink secondary cell is available, and wherein transmission timing of the ACK/NACK is determined according to any one of PDSCH reception timing and PDCCH reception timing.

The first to fourth aspects of the present invention may include some or all of the following features.

The ACK/NACK may be transmitted in an (n+4)th subframe when the PDCCH may be transmitted in an nth subframe the PDSCH is transmitted at a predetermined period of time before start time of the nth subframe.

The ACK/NACK may be transmitted in an (n+5)th subframe when the PDCCH may be transmitted in an nth subframe and the PDSCH is transmitted for predetermined time that exceeds a preset period of time from a start time of the n-th subframe.

The ACK/NACK is transmitted at a fourth subframe after a subframe corresponding to PDSCH transmission end time when PDSCH transmission time duration is greater than a subframe in which the PDCCH is transmitted.

A point of time when the downlink secondary cell is available may be determined as carrier sensing.

The PDCCH may be transmitted through any one of a first subframe after the PDSCH transmission begins in the downlink primary cell, a subframe in the downlink primary cell corresponding to the PDSCH transmission end time, and a first subframe after the PDSCH transmission is ended in the downlink primary cell.

The ACK/NACK may be received in a kth subframe after a PDCCH transmission subframe k (k=3, 4, 5).

Advantageous Effects

According to the present invention, ambiguity of transmission timing due to transmission delay that occurs when information is transmitted in a frequency band such as an unlicensed band may be prevented.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings

DESCRIPTION OF DRAWINGS

FIG. 9 illustrates the structure of PUCCH channel using block spread.

FIG. 10 illustrates the configuration of a multi-antenna wireless communication system.

FIG. 11 is a diagram for explanation of a DL reference signal.

FIG. 20 illustrates an example of a carrier sensing point of time according to an embodiment of the present invention.

FIG. 21 is a diagram illustrating a case in which ACK/NACK timing is changed according to PDSCH transmission timing.

FIG. 24 is a diagram for explanation of PDCCH transmission start time adjustment and ACK/NACK timing based thereon according to an embodiment of the present invention.

BEST MODE

Figure 1:
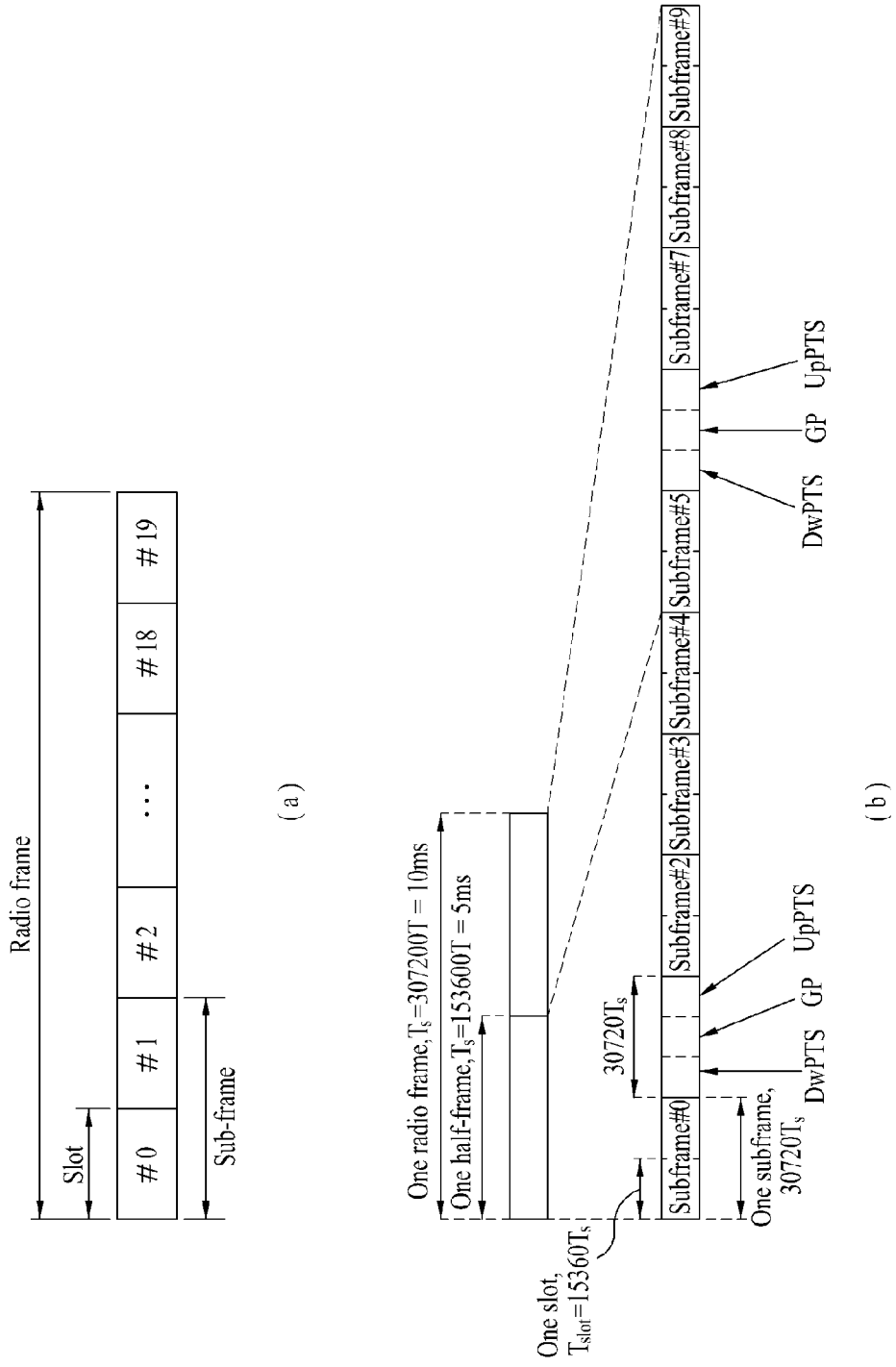
FIG. 1 illustrates a radio frame structure.

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

The embodiments of the present invention are disclosed on the basis of a data communication relationship between a base station and a terminal. In this case, the base station is used as a terminal node of a network via which the base station can directly communicate with the terminal. Specific operations to be conducted by the base station in the present invention may also be conducted by an upper node of the base station as necessary.

In other words, it will be obvious to those skilled in the art that various operations for enabling the base station to communicate with the terminal in a network composed of several network nodes including the base station will be conducted by the base station or other network nodes other than the base station. The term "base station (BS)" may be replaced with a fixed station, Node-B, eNode-B (eNB), or an access point as necessary. The term "relay" may be replaced with the terms relay node (RN) or relay station (RS). The term "terminal" may also be replaced with a user equipment (UE), a mobile station (MS), a mobile subscriber station (MSS) or a subscriber station (SS) as necessary.

It should be noted that specific terms disclosed in the present invention are proposed for convenience of description and better understanding of the present invention, and the use of these specific terms may be changed to other formats within the technical scope or spirit of the present invention.

In some instances, well-known structures and devices are omitted in order to avoid obscuring the concepts of the present invention and important functions of the structures and devices are shown in block diagram form. The same reference numbers will be used throughout the drawings to refer to the same or like parts.

Exemplary embodiments of the present invention are supported by standard documents disclosed for at least one of wireless access systems including an institute of electrical and electronics engineers (IEEE) 802 system, a $3^{rd}$ generation partnership project (3GPP) system, a 3GPP long term evolution (LTE) system, an LTE-advanced (LTE-A) system, and a 3GPP2 system. In particular, steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, code division multiple access (CDMA), frequency division multiple access (FDMA), time division multiple access (TDMA), orthogonal frequency division multiple access (OFDMA), single carrier frequency division multiple access (SC-FDMA), and the like. CDMA may be embodied through wireless (or radio) technology such as universal terrestrial radio access (utra) or CDMA2000. TDMA may be embodied through wireless (or radio) technology such as global system for mobile communication (GSM)/general packet radio service (GPRS)/enhanced data rates for GSM evolution (EDGE). OFDMA may be embodied through wireless (or radio) technology such as institute of electrical and electronics engineers (IEEE) 802.11 (Wi-Fi), IEEE 802.16 (WiMAX), IEEE 802-20, and evolved UTRA (E-UTRA). UTRA is a part of universal mobile telecommunications system (UMTS). 3rd generation partnership project (3GPP) long term evolution (LTE) is a part of evolved UMTS (E-UMTS), which uses E-UTRA. 3GPP LTE employs OFDMA in downlink and employs SC-FDMA in uplink. LTE-Advanced (LTE-A) is an evolved version of 3GPP LTE. WiMAX can be explained by IEEE 802.16e (wirelessMAN-OFDMA reference system) and advanced IEEE 802.16m (wirelessMAN-OFDMA advanced system). For clarity, the following description focuses on IEEE 802.11 systems. However, technical features of the present invention are not limited thereto.

FIG. 1 illustrates a radio frame structure used in a 3rd generation partnership project (3GPP) long term evolution (LTE) system. Referring to FIG. 1(a), one radio frame includes 10 subframes, and one subframe includes two slots in a time domain. A time required to transmit one subframe is defined as a transmission time interval (TTI). For example, one subframe may have a length of 1 ms and one slot may have a length of 0.5 ms. One slot may include a plurality of OFDM symbols in a time domain. Since the 3GPP LTE system adopts OFDMA in DL, an OFDM symbol indicates one symbol period. The OFDM symbol may be referred to as an SC-FDMA symbol or a symbol period in UL. A resource block (RB) is a resource allocation unit including a plurality of contiguous subcarriers in a slot. The aforementioned structure of the radio frame is merely an example, and various modifications may be made in the number of subframes included in one radio frame, the number of slots included in one subframe, or the number of OFDM symbols included in one slot.

FIG. 1(b) illustrates a type 2 radio frame structure. The type 2 radio frame includes two half frames, each of which includes five subframes, a DL pilot time slot (DwPTS), a guard period (GP), and a UL pilot time slot (UpPTS). One subframe includes two slots. DwPTS is used for initial cell search, synchronization, or channel estimation by UE.

UpPTS is used for channel estimation in an eNB and UL transmission synchronization of the UE. GP is located between UL and DL to remove interference generated in UL due to multi-path delay of a DL signal.

Here, the structure of the radio frame is merely an example, and various modifications may be made in the number of subframes included in the radio frame, the number of slots included in the subframe, or the number of symbols included in the slot.

Figure 2:
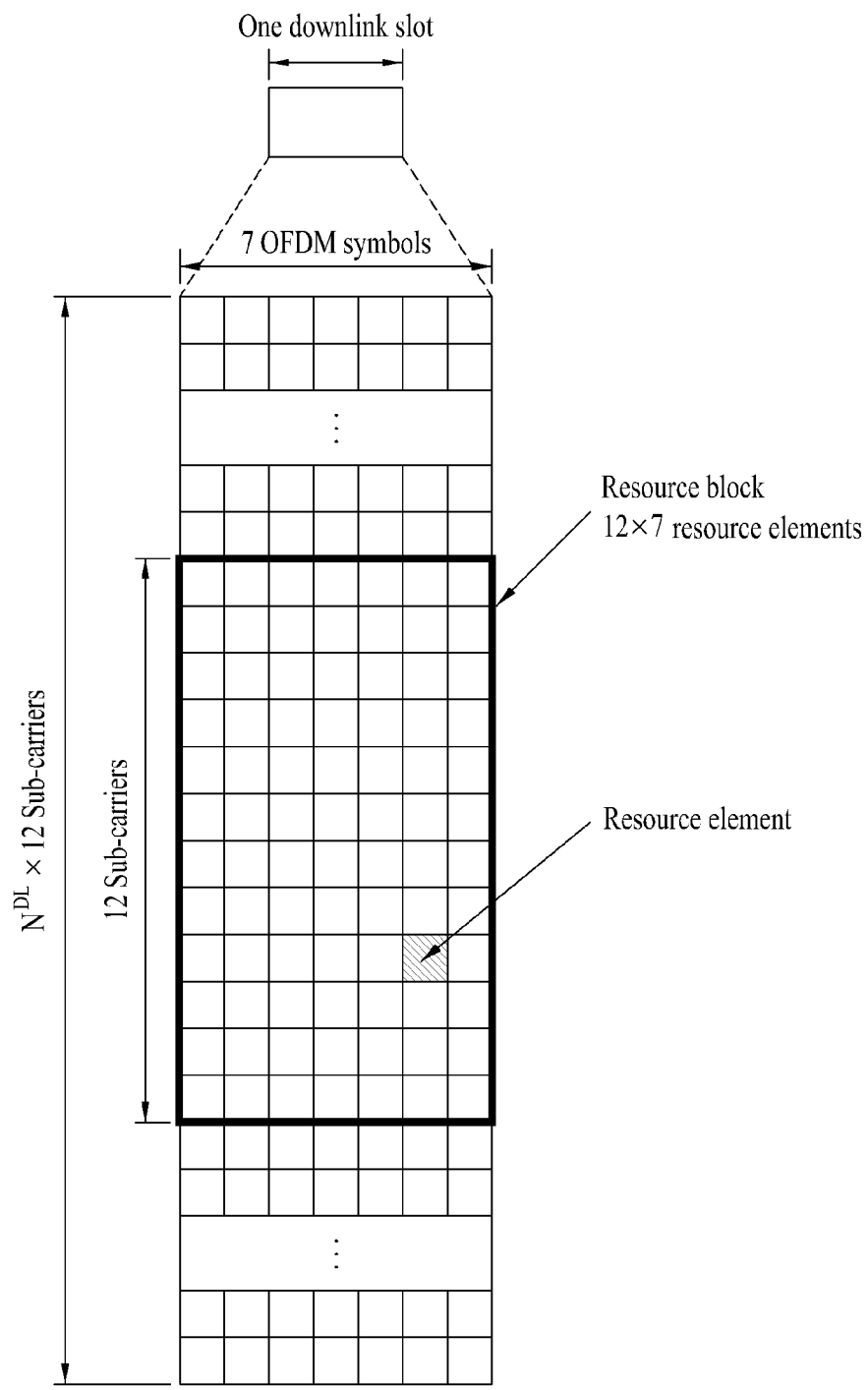
FIG. 2 is a diagram illustrating a resource grid for one DL slot.

FIG. 2 is a diagram illustrating a resource grid for one DL slot. In FIG. 2, although one DL slot includes 7 OFDM symbols in a time domain and one RB includes 12 subcarriers in a frequency domain, embodiments of the present invention are not limited thereto. For example, in case of a normal cyclic prefix (CP), one slot includes 7 OFDM symbols. However, in case of extended-CP, one slot may include 6 OFDM symbols. Each element on the resource grid is referred to as a resource element (RE). One RB includes 12×7 REs. A value of $N^{DL}$ that is the number of RBs included in the DL slot may be determined based on a DL transmission bandwidth. A UL slot may have the same structure as the DL slot.

Figure 3:
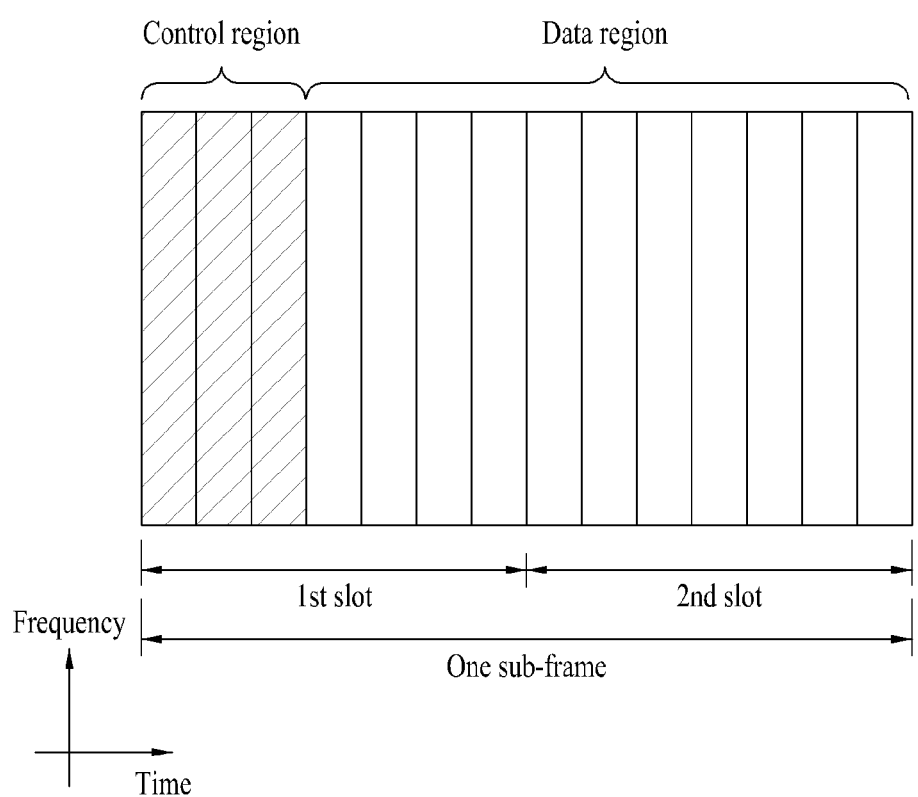
FIG. 3 is a diagram illustrating a structure of a downlink (DL) subframe.

FIG. 3 is a diagram illustrating a structure of a DL subframe. A maximum of three OFDM symbols of a front portion of a first slot within one subframe corresponds to a control region to which a control channel is allocated. The remaining OFDM symbols correspond to a data region to which a physical DL shared channel (PDSCH) is allocated. Examples of the DL control channels used in the 3GPP LTE system include a physical control format indicator channel (PCFICH), a physical DL control channel (PDCCH), a physical hybrid automatic repeat request indicator channel (PHICH), etc.

The PCFICH is transmitted on a first OFDM symbol of a subframe and includes information regarding the number of OFDM symbols used to transmit the control channel in the subframe.

The PHICH delivers an HARQ acknowledgment/negative acknowledgment (ACK/NACK) signal in response to an uplink transmission.

Control information delivered on the PDCCH is called downlink control information (DCI). The DCI transports uplink or downlink scheduling information, or uplink transmission power control commands for UE groups. The PDCCH delivers information about resource allocation and a transport format for a downlink shared channel (DL-SCH), resource allocation information about an uplink shared channel (UL-SCH), paging information of a paging channel (PCH), system information on the DL-SCH, information about resource allocation for a higher-layer control message such as a random access response transmitted on the PDSCH, a set of transmission power control commands for individual UEs of a UE group, transmission power control information, voice over interne protocol (VoIP) activation information, etc. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a cyclic redundancy check (CRC) to control information. The CRC is masked by an identifier (ID)

known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging indicator identifier (P-RNTI). If the PDCCH delivers system information, particularly, a system information block (SIB), its CRC may be masked by a system information ID and a system information RNTI (SI-RNTI). To indicate that the PDCCH delivers a random access response in response to a random access preamble transmitted by a UE, its CRC may be masked by a random access-RNTI (RA-RNTI).

PDCCH Processing

When a PDCCH is mapped to REs, a control channel element (CCE) is used as a contiguous logic allocation unit. One CCE includes a plurality of (e.g., 9) resource element groups (REGs) and one REG includes four REs that are adjacent except for a reference signal (RS).

The number of CCEs required for a specific PDCCH may vary according to DCI payload as the amount of control information, a cell bandwidth, an encoding rate, etc. In detail, the number of CCEs for a specific PDCCH may be defined according to PDCCH formats, as shown in Table 1 below.

TABLE 1

| PDCCH Format | CCE Number | REG Number | PDCCH Bit Number |
|---|---|---|---|
| 0 | 1 | 9 | 72 |
| 1 | 2 | 18 | 144 |
| 2 | 4 | 36 | 288 |
| 3 | 8 | 72 | 576 |

A PDCCH may have any one of the aforementioned four formats, which is not informed to UE. Thus, the UE needs to decode the PDCCH while not being informed of the PDCCH format, which is referred to as blind decoding. However, to decode all available CCEs used in DL with respect to each PDCCH format by UE is a burden, and thus, a search space is defined in consideration of limitation of a scheduler and attempt number of times.

That is, the search space is a set of candidate PDCCHs including CCEs on which UE attempts decoding on an aggregation level. Here, the aggregation level and the number of PDCCH candidates may be defined as Table 2 below.

TABLE 2

| | Search Space | | Number of PDCCH |
|---|---|---|---|
| | Aggregation Level | Size (CCE unit) | Candidates |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

As seen from Table 2 above, since four aggregation levels are present, UE has a plurality of search spaces according to an aggregation level. In addition, as shown in Table 2 above, the search space may be classified as a UE-specific search space and a common search space. The UE-specific search space is for specific UEs. In this regard, each UE may monitor (attempts to decode a PDCCH candidate set according to an available DCI format) the UE-specific search space and checks CRC and RNTI masked on PDCCH. In this case, when the CRC and RNTI are valid, the UE may acquire control information.

The common search space is required when a plurality of UEs or all UEs need to receive dynamic scheduling, paging message, and so on of system information through a PDCCH. However, the common search space may be used for specific UE in consideration of management of resources. In addition, the common search space may overlap the UE-specific search space. As described above, the UE attempts to decode a search space. The attempt number of times of decoding is determined in a transmission mode determined via a DCI format and RRC signaling. When carrier aggregation is not applied, the UE needs to consider two DCI sizes (DCI format 0/1A/3/3A and DCI format 1C) of each of the six PDCCH candidates with respect to the common search space, and thus, needs to attempt decoding a maximum of 12 number of times. With respect to the UE-specific search space, the UE needs to consider two DCI sizes of PDCCH candidates (6+6+2+2=16), and thus, needs to attempt decoding a maximum of 32 number of times. Thus, when carrier aggregation is not applied, a maximum of 44 attempt number of times of decoding is required.

Figure 4:
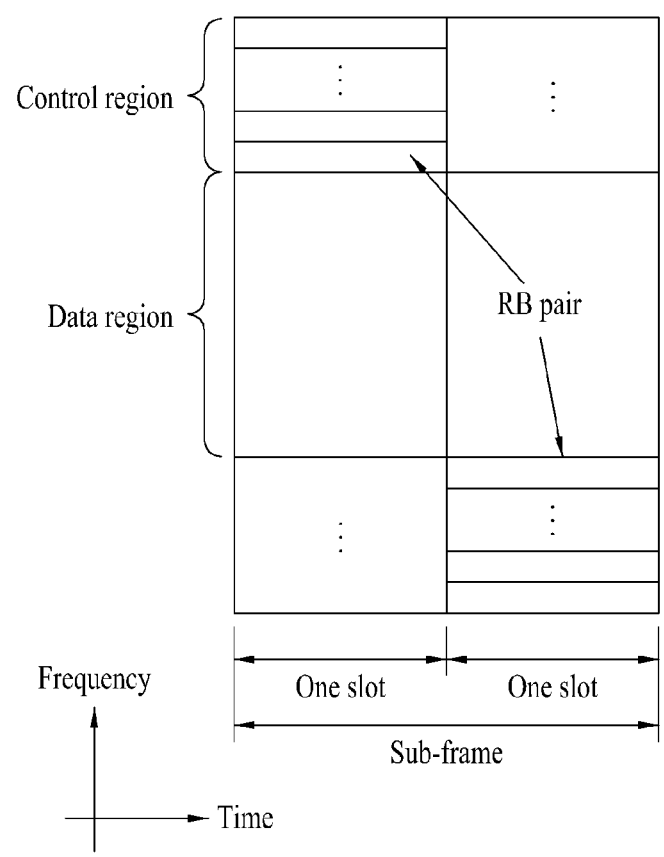
FIG. 4 illustrates the structure of an uplink (UL) subframe

FIG. 4 illustrates the structure of an uplink subframe. An uplink subframe may be divided into a control region and a data region in the frequency domain. A physical uplink control channel (PUCCH) delivering uplink control information is allocated to the control region and a physical uplink shared channel (PUSCH) delivering user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

PUCCH

UL control information (UCI) transmitted through a PUCCH may include scheduling request (SR), HARQ ACK/NACK information, and DL channel measurement information.

The HARQ ACK/NAC information may be generated according to whether a DL data packet on a PDSCH is successfully decoded. In a conventional wireless communication system, 1 bit is transmitted as ACK/NACK information during transmission of a DL single codeword and 2 bits are transmitted as ACK/NACK information during transmission of a DL 2 codeword.

The channel measurement information may refer to feedback information associated with a multiple input multiple output (MIMO) scheme and include a channel quality indicator (CQI), a precoding matrix index (PMI), and a rank indicator (RI). The channel measurement information may also be collectively referred to as CQI. For transmission of CQI, 20 bits may be used per subframe.

The PUCCH may be demodulated using a binary phase shift keying (BPSK) scheme and a quadrature phase shift keying (QPSK) scheme. Control information of a plurality of UEs may be transmitted through the PUCCH. When code division multiplexing (CDM) is performed in order to distinguish between signals of UEs, constant amplitude zero autocorrelation (CAZAC) with a length of 12 is mainly used. The CAZAC sequence has characteristics of maintaining a constant amplitude in a time domain and a frequency domain and thus is proper to reduce a peak-to-average power ratio (PAPR) or cubic metric (CM) of UE to increase coverage. In addition, ACK/NACK information in response to transmission of DL data transmitted through a PUCCH is covered using an orthogonal sequence or orthogonal cover (OC).

In addition, control information transmitted on a PUCCH may be distinguished using cyclically shifted sequences having different cyclic shift (CS) values. The cyclically shifted sequence may be generated by cyclically shifting a base sequence by as much as a specific CS amount. The specific CS amount is indicated by a CS index. The number of available CSs may be changed according to channel delay spread. Various types of sequences may be used as the base sequence and the aforementioned CAZAC sequence is an example of the base sequence.

In addition, the amount of control information that can be transmitted in one subframe by UE may be determined according to the number of SC-FDMA symbols (that is, SC-FDMA symbols except for SC-FDMA used to transmit a reference signal (RS) for coherent detection of PUCCH) that can be used to transmit the control information.

A PUCCH format 1 is used for single transmission of SR. In case of single transmission of SR, a non-modulated waveform is applied, which will be described below in detail.

A PUCCH format 1a or 1b is used to transmit HARQ ACK/NACK. When HARQ ACK/NACK is transmitted alone in a random subframe, the PUCCH format 1a or 1b may be used. Alternatively, HARQ ACK/NACK and SR may be transmitted in the same subframe using the PUCCH format 1a or 1b.

A PUCCH format 2 is used to transmit CQI and a PUCCH format 2a or 2b is used to transmit CQI and HARQ ACK/NACK. In the case of an extended CP, the PUCCH format may be used to transmit CQI and HARQ ACK/NACK.

Figure 5:
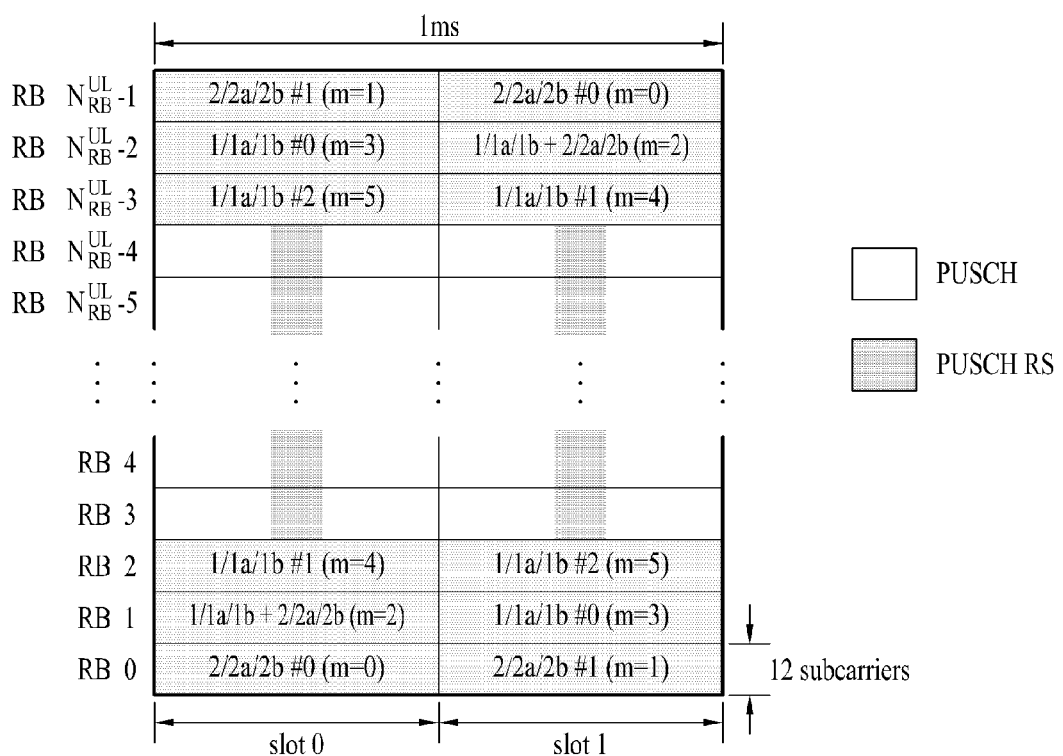
FIG. 5 illustrates a case in which PUCCH formats are mapped to PUCCH regions in a UL physical resource block.
Figure 6:
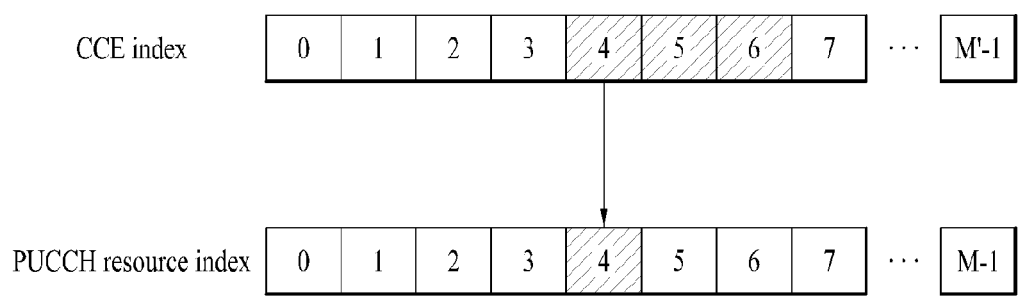
FIG. 6 illustrates an example in which PUCCH resources for ACK/NACK are determined.

FIG. 5 illustrates a case in which PUCCH formats are mapped to PUCCH regions in a UL physical resource block. In FIG. 5, $N_{RB}^{UL}$ indicates the number of resource blocks in UL and 0, 1, to $N_{RB}^{UL}-1$ refer to numbers of physical resource blocks. Basically, a PUCCH is mapped to opposite edges of an UL frequency block. As illustrated in FIG. 6, PUCCH formats 2/2a/2b are mapped to PUCCH regions indicated by m=0 and 1, which may be represented by that PUCCH formats 2/2a/2b are mapped to resource blocks positioned at band-edges. In addition, PUCCH formats 2/2a/2b and the PUCCH format 1/1a/1b may be mixed and mapped to a PUCCH region indicated by m=2. Then, PUCCH formats 1/1a/1b may be mapped to PUCCH regions indicated by m=3, 4, and 5. The number ($N_{RB}^{(2)}$) of available PUCCH RBs may be indicated by the PUCCH format 2/2a/2b to UEs in a cell via broadcast signaling.

PUCCH Resources

UE is allocated PUCCH resources for transmission of UL control information (UCI) from a base station (BS) in an explicit or implicit manner via higher layer signaling.

In case of ACK/NACK, a plurality of PUCCH resource candidates may be set by a higher layer with respect to UE. Among the PUCCH resource candidates, used PUCCH resource may be determined in an implicit manner. For example, the UE may receive the PDSCH from the BS and transmit ACK/NACK to a corresponding data unit through the PUCCH resource that is implicitly determined by PDCCH resources that deliver scheduling information regarding the PDSCH.

FIG. 6 illustrates an example in which PUCCH resources for ACK/NACK are determined.

In an LTE system, a plurality of PUCCH resources are divided and used by a plurality of UEs in a cell every time instead of being pre-allocated to each UE. In detail, PUCCH resources used to transmit the ACK/NACK by the UE are determined in an implicit manner based on a PDCCH that delivers scheduling information regarding PDSCH that delivers corresponding DL data. An entire region in which a PDCCH is transmitted in each DL subframe includes a plurality of control channel elements (CCEs), and the PDCCH transmitted to the UE includes one or more CCEs. A CCE includes a plurality of (e.g., 9) resource element groups (REGs). One REG includes four resource elements (REs) that are adjacent except for a reference signal (RS). The UE transmits ACK/NACK through implicit PUCCH resources that are derived or calculated according to a function of a specific CCE index (e.g., a first or lowest CCE index) among CCE indexes included in the PDCCH received by the UE.

Referring to FIG. 6, each PUCCH resource index corresponds to PUCCH resources for ACK/NACK. As illustrated in FIG. 6, assuming that scheduling information regarding PDSCH is transmitted to UE through a PDCCH including CCEs 4 to 6, the UE transmits ACK/NACK to a BS through a PUCCH that is derived or calculated from a CCE index 4 that is a lowest CCE included in the PDCCH, for example, a PUCCH 4. FIG. 6 illustrates a case in which a maximum of M' CCEs are present in DL and a maximum of M PUCCHs are present in UL. M'=M or M' may be different from M. In addition, CCE and PUCCH resources may be mapped to overlap.

For example, a PUCCH resource index may be determined according to Equation 15 below.

$$n_{PUCCH}^{(1)} = n_{CCE} + N_{PUCCH}^{(1)} \quad \text{[Equation 15]}$$

Here, n(1)PUCCH indicates a PUCCH resource index for transmission of ACK/NACK and N(1)PUCCH indicates a signaling value transmitted in a higher layer. nCCE indicates a smallest value among CCE indexes used to transmit a PDCCH. The PUCCH will be described in more detail.

PUCCH Channel Structure

First, PUCCH formats 1a and 1b will be described.

With regard to the PUCCH formats 1a/1b, a symbol modulated using a BPSK or QPSK modulation method is multiplied by a CAZAC sequence with a length of 12. For example, results obtained by multiplying a modulation symbol d(0) by CAZAC sequence r(n) (n=0, 1, 2, to N−1) with a length of N are y(0), y(1), y(2), to y(N−1). The symbols y(0) to y(N−1) may be referred to as a block of symbol. After a modulation symbol is multiplied by a CAZAC sequence, block-wise spread using an orthogonal sequence may be applied.

A Hadamard sequence with a length of 4 is used for general ACK/NACK information and a discrete Fourier transform (DFT) with a length of 3 is used for shortened ACK/NACK information. In case of extended CP, a Hadamard sequence with a length of 2 is used for a reference signal.

Figure 7:
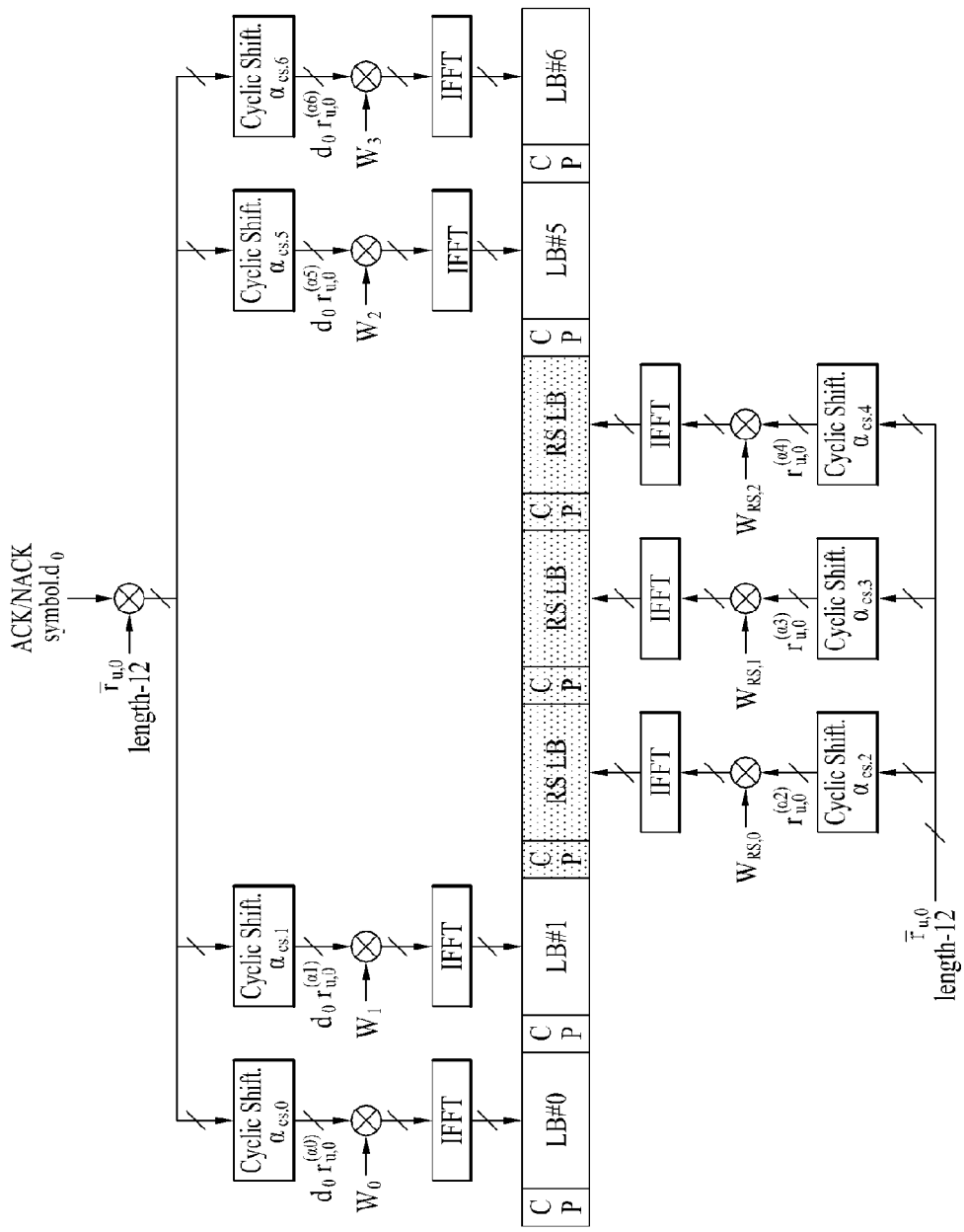
FIG. 7 illustrates the structure of an ACK/NACK channel in case of normal CP.

FIG. 7 illustrates the structure of an ACK/NACK channel in case of normal CP. FIG. 7 illustrates an example of the structure of a PUCCH channel for transmission of HARQ ACK/NACK without CQI. Reference signals (RSs) are delivered in three contiguous SC-FDMA symbols corresponding to central parts of seven SC-FDMA symbols included in one slot and ACK/NACK signals are delivered in the four remaining SC-FDMA symbols. In case of extended CP, RSs may be delivered in two central contiguous symbols. The number and positions of symbols used in an RS may be changed according to a control channel and the number and positions of symbols used in an ACK/

NACK signal associated with the RS may be changed according to the control channel.

1 bit and 2 bit ACK information (that is not scrambled) may be represented in one HARQ ACK/NACK modulation symbol using BPSK and QPSK modulation schemes. ACK may be encoded to '1' and NACK may be encoded to '0'.

When a control signal is transmitted in an allocated band, 2D spread is applied in order to increase multiplex capacity. That is, in order to increase the number of control channels or UEs that can be multiplexed, frequency domain spread and time domain spread may be simultaneously applied. In order to spread an ACK/NACK signal in a frequency domain, a frequency domain sequence is used as a base sequence. As the frequency domain sequence, a zadoff-chu (ZC) sequence that is one of CAZAC sequences may be used. For example, by applying different cyclic shifts (CSs) to the ZC sequence as a base sequence, multiplexing of different UEs or different control channels may be applied. The number of CSs that are supported by an SC-FDMA symbol for PUCCH RBs for transmission of HARQ ACK/NAC is set by a cell-specific higher-layer signaling parameter ($\Delta_{shift}^{PUCCH}$) and $\Delta_{shift}^{PUCCH} \in \{1, 2, 3\}$ represent 12, 6, and 4 shifts, respectively.

A frequency domain spread ACK/NACK signal is spread in a time domain using an orthogonal spreading code. As the orthogonal spreading code, a Walsh-Hadamard sequence or a DFT sequence may be used. For example, the ACK/NACK signal may be spread using orthogonal sequences (w0, w1, w2, w3) with a length of 4 with respect to four 4 symbols. In addition, the RS may also be spread via an orthogonal sequence with a length of 3 or 2, which is referred to as orthogonal covering (OC).

A plurality of UEs may be multiplexed using a code division multiplex (CDM) method using the aforementioned CS resources in frequency domain and OC resources in time domain. That is, ACK/NACK information and RS of many UEs may be multiplexed on the same PUCCH RB.

With regard to the time domain spread CDM, the number of spread codes supported with respect to ACK/NACK information may be limited according to the number of RS symbols. That is, the number of RS transmission SOFDMA symbols is less than the number of ACK/NACK information transmission SC-FDMA symbols, and thus, multiplex capacity of RS is less than multiplex capacity of ACK/NACK information. For example, in case of normal CP, ACK/NACK information may be transmitted in four symbols. However, three orthogonal spread codes instead of four may be used for ACK/NACK information. This is because the number of RS transmission symbols is limited to three and only three orthogonal spread codes can be used for RS.

An example of the orthogonal sequences used to spread ACK/NACK information is shown in Table 3 and 4 below. Table 3 shows sequences of a symbol with a length of 4 and Table 4 shows sequences of a symbol with a length of 3. The sequences of the symbol with a length of 4 are used in PUCCH formats I/1a/1b of a normal subframe configuration. In the subframe configuration, in consideration of a case in which a sounding reference signal (SRS) is transmitted in a last symbol of a second slot, a sequence of a symbol with a length of 4 may be used in a first slot and shortened PUCCH formats 1/1a/1b of a sequence of a symbol with a length of 3 may be used in a second slot.

TABLE 3

| Sequence index | {w(0), w(1), w(2), w(3)} |
|---|---|
| 0 | [+1 +1 +1 +1] |
| 1 | [+1 −1 +1 −1] |
| 2 | [+1 −1 −1 +1] |

TABLE 4

| Sequence index | {w(0), w(1), w(2)) |
|---|---|
| P0 | $[1\ 1\ 1]$ |
| 1 | $[1\ e^{j2\pi/3}\ e^{j4\pi/3}]$ |
| 2 | $[1\ e^{j4\pi/3}\ e^{j2\pi/3}]$ |

Meanwhile, an example of orthogonal sequences used to spread RS of an ACK/NACK channel is shown in Table 4 below.

TABLE 4

| Sequence index | Normal CP | Extended CP |
|---|---|---|
| 0 | $[1\ 1\ 1]$ | [1 1] |
| 1 | $[1\ e^{j2\pi/3}\ e^{j4\pi/3}]$ | [1 −1] |
| 2 | $[1\ e^{j4\pi/3}\ e^{j2\pi/3}]$ | N/A |

In a subframe of normal CP, when three symbols in one slot are used for transmission of RS and four symbols in one slot are used for transmission of ACK/NACK information, for example, if six CSs in frequency domain and three OC resources in time domain can be used, HARQ ACK from total 18 different UEs may be multiplexed in one PUCCH RB. In a subframe of extended CP, when two symbols in one slot are used for transmission of RS and four symbols in one slot are used for transmission of ACK/NACK information, for example, if six CSs in frequency domain and two OC resources in time domain can be used, HARQ ACK from total 12 different UEs may be multiplexed in one PUCCH RB.

Hereinafter, PUCCH format 1 will be described. Scheduling request (SR) is transmitted by requesting scheduling or not requesting scheduling by UE. An SR channel reuses an ACK/NACK channel structure in PUCCH formats 1a/1b and is configured using an on-off keying (00K) method based on a design of the ACK/NACK channel. In an SR channel, an RS is not transmitted. Thus, in case of normal CP, a sequence with a length of 7 is used. In case of extended CP, a sequence with a length of 6 is used. Different cyclic shifts (CSs) or OSs may be allocated to SR and ACK/NACK. That is, UE transmits HARQ ACK/NACK through resources allocated to SR for transmission of positive SR. The UE transmits HARQ ACK/NACK through resources allocated for ACK/NACK for transmission negative transmission.

Hereinafter, PUCCH formats 2/2a/2b will be described. The PUCCH formats 2/2a/2b is a control channel for transmission of channel measurement feedback (CQI, PMI, and RI).

A report period of the channel measurement feedback (hereinafter, collectively referred to as CQI information) and a frequency unit (or frequency resolution) as a measurement target may be controlled by a BS. In time domain, periodic or aperiodic CQI report may be supported. PUCCH format 2 may be used only for periodic report and PUSCH may be used for aperiodic report. In case of the aperiodic report, the BS may request the UE to deliver individual CQI report in scheduled resources and transmit the CQI report for UL data transmission.

Figure 8:
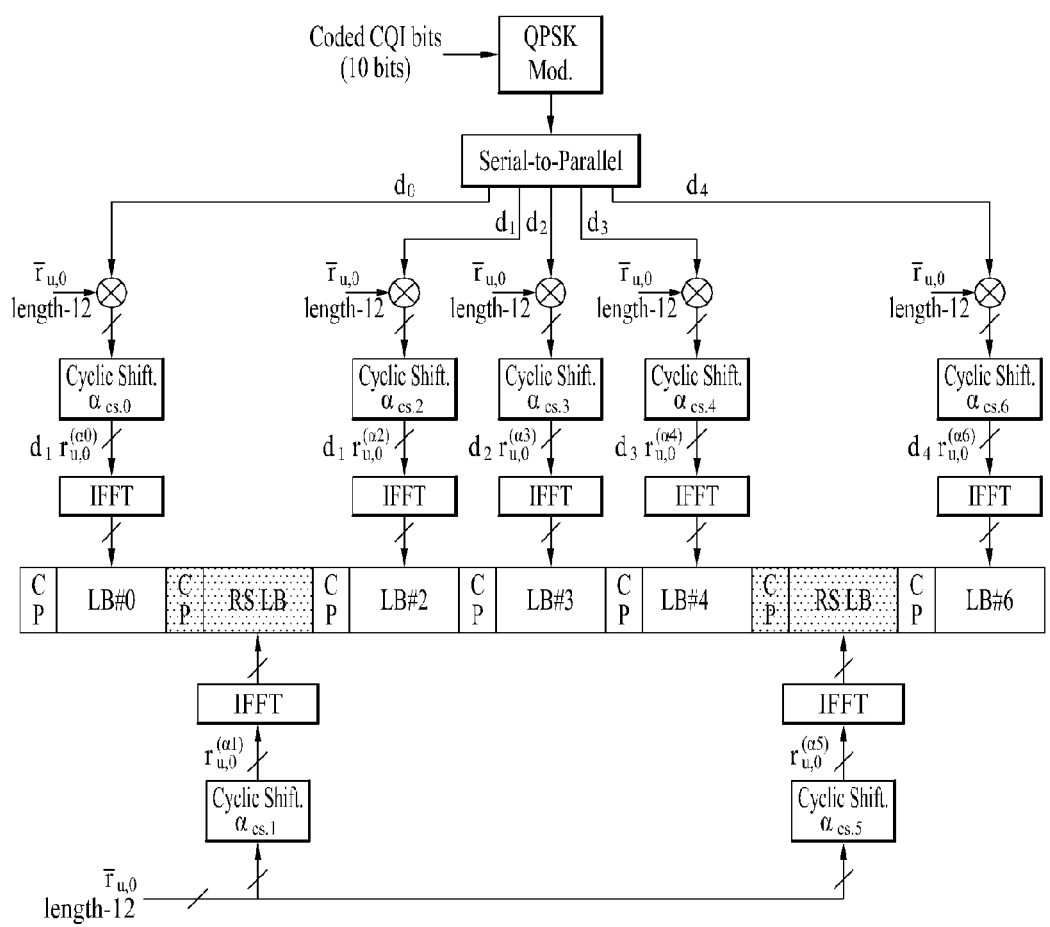
FIG. 8 illustrates the structure of CQI channel in case of normal CP.

FIG. 8 illustrates the structure of CQI channel in case of normal CP. Among SC-FDMA symbols 0 to 6 in one slot, SC-FDMA symbols 1 and 5 (second and sixth symbols) may be used to transmit a demodulation reference signal (DMRS). CQI information may be transmitted in the remaining SC-FDMA symbol. In case of extended CP, one SC-FDMA symbol (SC-FDMA symbol 3) is used to transmit the DMRS.

In PUCCH formats 2/2a/2b, modulation in a CAZAC sequence is supported and a length of a QPSK-modulated symbol is multiplied by a CAZAC sequence with a length of 12. CS of sequence is changed between symbols and slots. OC is used with respect to the DMRS. The reference signal DMRS is delivered in two SC-FDMA symbols spaced apart from each other by an interval corresponding to three SC-FDMA symbols among seven SC-FDMA symbols included in one slot and CQI information is delivered in the five remaining SC-FDMA symbols. Two RSs are used in one slot in order to support high-speed UE. In addition, UEs may be distinguished using a CS sequence. CQI information symbols are modulated and transmitted in all SC-FDMA symbols. A SC-FDMA symbol includes one sequence. That is, the UE modulates and transmit CQI in each sequence.

The number of symbols transmitted in one TTI is 10 and QPSK of modulation of CQI information is also determined. When QPSK mapping is used in an SC-FDMA symbol, a 2 bit CQI value can be delivered in the symbol, and thus, a 10 bit CQI value may be delivered in one slot. Thus, a maximum of 20 bit CQI value may be delivered in one subframe. A frequency domain spread code is used to spread CQI information in frequency domain.

A CAZAC sequence (e.g., ZC sequence) with a length of 12 may be used as the frequency domain spread code. Control channels may be distinguished using CAZAC sequences having different cyclic shift values. IFFT is performed on frequency-domain spread CQI information.

12 different UEs may be orthogonally multiplexed on the same PUCCH RB using 12 CSs with a regular interval. In case of normal CP, a DMRS sequence on SC-FDMA symbols 1 and 5 (SC-FDMA symbol 3 in case of extended CP) is similar to a CQI signal sequence in frequency domain, but the same modulation as that of CQI information may not be applied. The UE may be semi-statically set via high-layer signaling so as to periodically report different CQI, PMI, and RI types on PUCCH resources indicated by a PUCCH resource index ($n_{PUCCH}^{(2)}$). Here, the PUCCH resource index ($n_{PUCCH}^{(2)}$) corresponds to information indicating a PUCCH region used for PUCCH formats 2/2a/2b transmission and a CS value to be used.

Hereinafter, an enhanced-PUCCH (e-PUCCH) format will be described. The e-PUCCH may correspond to PUCCH format 3 of an LTE-A system. A block spreading scheme may be used for ACK/NACK transmission using PUCCH format 3.

According to the block spreading scheme, unlike conventional PUCCH format 1 or 2, transmission of control signal may be modulated using a SC-FDMA scheme. As illustrated in FIG. 9, a symbol sequence may be spread and transmitted in time domain using an orthogonal cover code (OCC). By using the OCC, control signals of a plurality of UEs may be multiplexed on the same RB. In case of the aforementioned PUCCH format 2, one symbol sequence is transmitted across time domain and control signals of a plurality of UEs are multiplexed using CS of the CAZAC sequence. On the other hand, in case of a block spread based PUCCH format (e.g., PUCCH format 3), one symbol sequence is transmitted across frequency domain and control signals of a plurality of UEs are multiplexed using time domain spread using OCC.

FIG. 9(a) illustrates an example in which four SC-FDMA symbols (that is, data portion) are generated and transmitted using OCC of a length=4 (or spreading factor (SF)=4) in one symbol sequence for one slot. In this case, three RS symbols (that is, RS portion) may be used for one slot.

In addition, FIG. 9(b) illustrates an example in which five SC-FDMA symbols (that is, data portion) are generated and transmitted using OCC of a length=5 (or SF=5) in one symbol sequence for one slot. In this case, two RS symbols may be used in one slot. In the example of FIG. 9, the RS symbol may be generated in a CAZAC sequence to which a specific CS value is applied and transmitted while predetermined OCC is applied (multiplied) across the plural RS symbols. In addition, in the example of FIG. 9, assuming that 12 modulation symbols are used per OFDM symbol (or per SC-FDMA symbol) and each modulation symbol is generated using QPSK, the number of maximum bits that can be transmitted in on slot is 12×2=24 bits. Thus, the number of bits that can be transmitted in two slots is total 48 bits. When the PUCCH channel structure using the block spreading scheme is used, it may be possible to transmit control information of an extended size compared existing PUCCH formats 1 and 2.

Multiple Input Multiple Output (MIMO)

FIG. 10 illustrates the configuration of a multi-antenna wireless communication system.

Referring to FIG. 10(a), when the number of Transmission (Tx) antennas and the number of Reception (Rx) antennas are increased to $N_T$ and $N_R$, respectively at both a transmitter and a receiver, a theoretical channel transmission capacity increases in proportion to the number of antennas, compared to use of a plurality of antennas at only one of the transmitter and the receiver. Therefore, transmission rate and frequency efficiency can be remarkably increased. Along with the increase of channel transmission capacity, the transmission rate may be increased in theory to the product of a maximum transmission rate $R_o$ that may be achieved by means of a single antenna and a rate increase rate $R_i$.

$$R_i = \min(N_T, N_R) \qquad \text{[Equation 1]}$$

For instance, a MIMO communication system with four Tx antennas and four Rx antennas may achieve a four-fold increase in transmission rate theoretically, relative to a single-antenna wireless communication system.

A communication method in the multi-antenna wireless communication system will be described in detail through mathematical modeling. It is assumed that $N_T$ Tx antennas and $N_R$ Rx antennas are present in the system.

Regarding a transmission signal, up to $N_T$ pieces of information can be transmitted through the $N_T$ Tx antennas, as expressed as the following vector.

$$s = [s_1, s_2, \ldots, s_{N_T}]^T \qquad \text{[Equation 2]}$$

A different transmission power may be applied to each piece of transmission information, $s_1, s_2, \ldots, s_{N_T}$. Let the transmission power levels of the transmission information be denoted by $P_1, P_2, \ldots, P_{N_T}$, respectively. Then the transmission power-controlled transmission information vector may be given as $$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{[Equation 3]}$$

The transmission power-controlled transmission information vector ŝ may be expressed as follows, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

$N_T$ transmission signals $x_1, x_2, \ldots, x_{N_T}$ may be generated by multiplying the transmission power-controlled information vector $\hat{s}$ by a weight matrix $W$. The weight matrix $W$ functions to appropriately distribute the transmission information to the respective Tx antennas according to transmission channel states, etc. These $N_T$ transmission signals $x_1, x_2, \ldots, x_{N_T}$ are represented as a vector $x$, which may be determined as $$x = \begin{bmatrix} x_1 \\ x_2 \\ \vdots \\ x_i \\ \vdots \\ x_{N_T} \end{bmatrix} \quad \text{[Equation 5]}$$

$$= \begin{bmatrix} w_{11} & w_{12} & \ldots & w_{1N_T} \\ w_{21} & w_{22} & \ldots & w_{2N_T} \\ \vdots & & \ddots & \\ w_{i1} & w_{i2} & \ldots & w_{iN_T} \\ \vdots & & & \ddots \\ w_{N_T 1} & w_{N_T 2} & \ldots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix}$$

$$= W\hat{s} = WPs$$

Here, $w_{ij}$ denotes a weight between an $i^{th}$ Tx antenna and a $j^{th}$ piece of information.

Given $N_R$ Rx antennas, signals received at the Rx antennas, $y_1, y_2, \ldots, y_{N_R}$ may be represented as the following vector.

$$y = [y_1, y_2, \ldots, y_{N_R}]^T \quad \text{[Equation 6]}$$

When channels are modeled in the MIMO wireless communication system, they may be distinguished by the indexes of Tx and Rx antennas. A channel between a $j^{th}$ Tx antenna and an $i^{th}$ Rx antenna is denoted by $h_{ij}$. The index of an Rx antenna precedes the index of a Tx antenna in $h_{ij}$.

FIG. 10(b) illustrates channels from $N_T$ Tx antennas to an $i^{th}$ Rx antenna. The channels may be collectively represented as a vector or a matrix. In FIG. 10(b), the channels from the $N_T$ Tx antennas to the $i^{th}$ Rx antenna may be expressed as [Equation 7].

$$h_i^T = [h_{i1}, h_{i2}, \ldots, h_{iN_T}] \quad \text{[Equation 7]}$$

Hence, all channels from the $N_T$ Tx antennas to the $N_R$ Rx antennas may be expressed as the following matrix.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & & \ddots \\ h_{N_R 1} & h_{N_R 2} & \ldots & h_{N_R N_T} \end{bmatrix} \quad \text{[Equation 8]}$$

Actual channels experience the above channel matrix H and then are added with Additive White Gaussian Noise (AWGN). The AWGN $n_1, n_2, \ldots, n_{N_R}$ added to the $N_R$ Rx antennas is given as the following vector.

$$n = [n_1, n_2, \ldots, n_{N_R}]^T \quad \text{[Equation 9]}$$

From the above mathematical modeling, the received signal vector is given as $$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & & \ddots \\ h_{N_R 1} & h_{N_R 2} & \ldots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Equation 10]}$$

$$Hx + n$$

The numbers of rows and columns in the channel matrix H representing channel states are determined according to the numbers of Rx antennas and Tx antennas. Specifically, the number of rows in the channel matrix H is equal to the number of Rx antennas, $N_R$ and the number of columns in the channel matrix H is equal to the number of Tx antennas, $N_T$. Hence, the channel matrix H is of size $N_R \times N_T$.

The rank of a matrix is defined as the smaller between the number of independent rows and the number of independent columns in the matrix. Accordingly, the rank of the matrix is not larger than the number of rows or columns of the matrix. The rank of the channel matrix H, rank(H) satisfies the following constraint.

$$\text{rank}(H) \leq \min(N_T, N_R) \quad \text{[Equation 11]}$$

The rank of a matrix may also be defined as the number of non-zero eigenvalues, when the matrix is decomposed by EigenValue Decomposition (EVD). Similarly, the rank of a matrix may be defined as the number of non-zero singular values, when the matrix is decomposed by Singular Value Decomposition (SVD). Therefore, the rank of a channel matrix may be the maximum number of different pieces of information that can be transmitted on a physical channel, in its physical meaning.

Reference Signal (RS)

In a wireless communication system, a packet is transmitted on a radio channel. In view of the nature of the radio channel, the packet may be distorted during transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion degree of the signal received on the radio channel. This signal is called a pilot signal or an RS.

In the case of data transmission and reception through multiple antennas, knowledge of channel states between Tx antennas and Rx antennas is required for successful signal reception. Accordingly, an RS should exist for each Tx antenna.

Downlink RSs are categorized into common RS (CRS) shared among all UEs and Dedicated RS (DRS) specific to a particular UE. These RSs may deliver information for channel estimation and demodulation.

A receiver (i.e. a UE) may feedback a channel quality-related indicator such as a channel quality indicator (CQI), a precoding matrix index (PMI), and/or a rank indicator (RI) to a transmitter (i.e. an eNB) by estimating channel states using CRSs. The CRS is also called a cell-specific RS. An RS related to feedback of channel state information (CSI) such as a CQI/PMI/RI may be separately defined as a CSI-RS.

A DRS may be transmitted on a predetermined RE, when data transmitted on a PDSCH needs to be demodulated. A higher layer may notify a UE whether a DRS exists and also notify the UE that only when a related PDSCH is mapped, the DRS is valid. The DRS is also called a UE-specific RS or demodulation reference signal (DMRS).

FIG. 11 illustrates patterns in which CRSs and DRSs are mapped to a DL RB, as defined in a conventional 3GPP LTE system (e.g. conforming to Release-8). An RS mapping unit, i.e. a DL RB may include one subframe in time by 12 subcarriers in frequency. That is, an RB includes 14 OFDM symbols in time in the case of a normal CP (see FIG. 11(b)) and 12 OFDM symbols in time in the case of an extended CP (see FIG. 11(b)).

In FIG. 11, the positions of RSs in an RB pair for a system where an eNB supports four Tx antennas are illustrated. REs labeled with '0', '1', '2' and '3' are the positions of CRSs for first to fourth antenna ports, antenna port 0 to antenna port 3, respectively, and REs labeled with 'D' denote the positions of DRSs.

Cooperative Multi-Point (CoMP)

According to enhanced system performance requirements for the 3GPP LTE-A system, CoMP transmission and reception technology known as co-MIMO, collaborative MIMO or network MIMO has been proposed. CoMP can increase the performance of UEs located at a cell edge and average sector throughput.

It is known that inter-cell interference (ICI) may degrade the performance of a UE at a cell edge and decrease an average sector throughput in a multi-cellular environment with a frequency reuse factor of 1. To offer an appropriate throughput performance to a cell-edge UE in an environment constrained by interference, a simple ICI mitigation technique such as UE-specific power control-based fractional frequency reuse (FFR) is used in the conventional LTE system. However, it may be preferred to reduce the ICI or reuse the ICI as a desired signal for the UE, rather than to decrease the utilization of frequency resources per cell. For this purpose, CoMP transmission techniques may be adopted.

Downlink CoMP schemes are classified largely into Joint Processing (JP) and Coordinated Scheduling/Beamforming (CS/CB).

According to the JP scheme, each point (eNB) of a CoMP cooperation unit may use data. The CoMP cooperation unit refers to a set of eNBs used for a CoMP transmission operation. The JP scheme is further branched into joint transmission and dynamic cell selection.

Joint transmission is a technique of transmitting PDSCHs from a plurality of points (a part or the whole of a CoMP cooperation unit) at one time. That is, a plurality of transmission points may simultaneously transmit data to a single UE. The joint transmission scheme can improve the quality of a received signal coherently or non-coherently and actively eliminate interference to other UEs, as well.

Dynamic cell selection is a technique of transmitting a PDSCH from one point of a CoMP cooperation unit at one time. That is, one point of the CoMP cooperation unit transmits data to a single UE at a given time point, while the other points of the CoMP cooperation unit do not transmit data to the UE at the time point. A point to transmit data to a UE may be dynamically selected.

Meanwhile, in the CS/CB scheme, a CoMP cooperation unit may perform cooperative beamforming for data transmission to a single UE. While only a serving cell transmits data to the UE, user scheduling/beamforming may be determined through coordination among cells of the CoMP cooperation unit.

Uplink CoMP reception refers to uplink reception of a transmitted signal through coordination at a plurality of geographically separated points. Uplink CoMP schemes include Joint Reception (JR) and Coordinated Scheduling/Beamforming (CS/CB).

In JR, a plurality of reception points receives a signal transmitted on a PUSCH. CS/CB is a technique in which while only one point receives a PUSCH, user scheduling/beamforming is determined through coordination among cells of a CoMP cooperation unit.

Sounding Reference Signal (SRS)

An SRS is used for an eNB to measure channel quality and perform uplink frequency-selective scheduling based on the channel quality measurement. The SRS is not associated with uplink data and/or control information transmission. However, the usages of the SRS are not limited thereto. The SRS may also be used for enhanced power control or for supporting various start-up functions of unscheduled UEs. The start-up functions may include, for example, an initial modulation and coding Scheme (MCS), initial power control for data transmission, timing advance, and frequency non-selective scheduling (frequency non-selective scheduling refers to a type of scheduling in which a transmitter selectively allocates a frequency resource to the first slot of a subframe and then pseudo-randomly hops to another frequency resource in the second slot of the subframe). In addition, the SRS may be used for measuring DL channel quality on the assumption of the reciprocity of a radio channel between the DL and the uplink. This assumption is valid especially in a TDD system in which the DL and the uplink share the same frequency band and are distinguished in a time domain.

A subframe in which a UE within a cell is supposed to transmit an SRS is indicated by cell-specific broadcast signaling. A 4-bit cell-specific parameter 'srsSubframeConfiguration' indicates 15 possible configurations for subframes delivering SRSs in each radio frame. These configurations may provide flexibility with which SRS overhead can be adjusted according to network deployment scenarios. The other one configuration (a $16^{th}$ configuration) represented by the parameter is perfect switch-off of SRS transmission in a cell, suitable for a cell serving high-speed UEs, for example.

Figure 12:
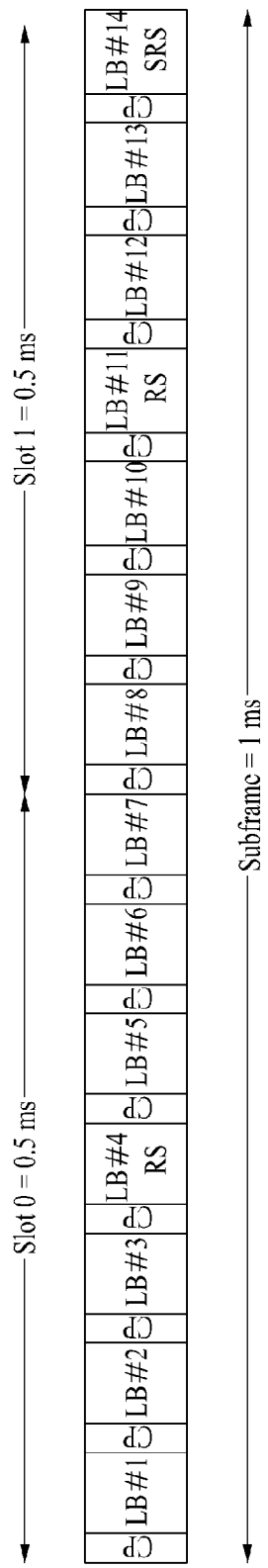
FIG. 12 is a diagram for explanation of a sounding reference signal.

Referring to FIG. 12, an SRS is always transmitted in the last SC-FDMA symbol of a configured subframe. Therefore, an SRS and a demodulation reference signal (DMRS) are positioned in different SC-FDMA symbols. PUSCH data transmission is not allowed in an SC-FDMA symbol designated for SRS transmission. Accordingly, even the highest sounding overhead (in the case where SRS symbols exist in all subframes) does not exceed 7%.

Each SRS symbol is generated for a given time unit and frequency band, using a base sequence (a random sequence or zadoff-chu (ZC)-based sequence set), and all UEs within a cell use the same base sequence. SRS transmissions in the same time unit and the same frequency band from a plurality of UEs within a cell are distinguished orthogonally by different cyclic shifts of the base sequence allocated to the plurality of UEs. Although the SRS sequences of different cells may be distinguished by allocating different base sequences to the cells, orthogonality is not ensured between the different base sequences.

Relay

A relay may be considered for the purpose of extending the service coverage or is installed in a shadow area to smoothen a service. UE communicates with a BS or a relay. UE that communicates with the eNB is referred to as a macro UE, and UE that communicates with the relay is referred to as a relay UE. A communication link between the BS and the macro UE is referred to as a macro access link and a communication link between the relay and the relay UE is referred to as a relay access link. In addition, a communication link between the eNB and the relay is referred to as a backhaul link.

The relay may be classified as a layer 1 (L1) relay, a layer 2 (L2) relay, or a layer 3 (L3) relay according to a portion of a function performed by the relay during multi-hop transmission. In addition, the relay may be classified as an in-band connection in which network-relay link and a network-UE link share the same frequency band in a donor cell, and an out-band connection in which a network-relay link and a network-UE link use different frequency bands in a donor cell, according to network link. Furthermore, the relay may also be classified as a transparent relay, transmission through which a UE is unaware of, and a non-transparent relay, transmission through which a UE is aware of. In terms of mobility, the relay may be classified as a fixed relay that may be used in a shadow region or to increase cell coverage, a nomadic relay that may be temporally installed or randomly moved when the number of users suddenly increases, and a mobile relay that may be installed in public transportation such as a bus, a train, etc.

Figure 13:
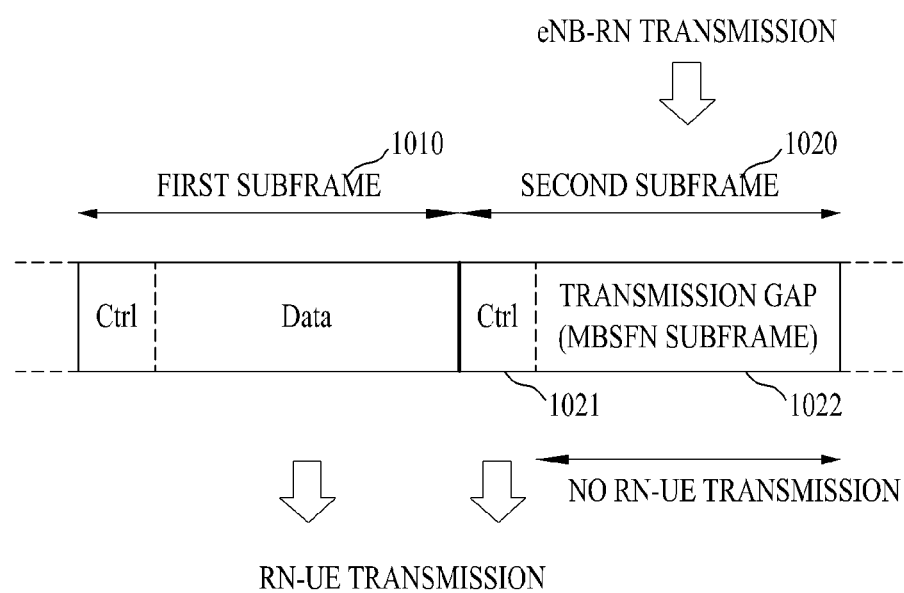
FIG. 13 is a diagram for explanation of resource division for relay.

FIG. 13 is a diagram illustrating an example in which backhaul transmission is performed using a multicast broadcast single frequency network (MBSFN) subframe. In an in-band relay mode, an eNB-relay link (e.g., backhaul link) operates in the same frequency bandwidth as that of a relay-UE link (e.g., relay access link). When a relay transmits a signal to UE while receiving a signal from an eNB or receives a signal from the UE while transmitting a signal to the eNB, a transmitter and a receiver of the relay may interfere with each other, and thus, simultaneous transmission and reception of the relay may be limited. To this end, a backhaul link and relay access link may be partitioned in a TDM manner. An LTE-A system configures backhaul link in the MBSFN subframe in order to support a measurement operation of a legacy LTE UE present in a relay zone (a fake MBSFN method). When a certain subframe is signaled as an MBSFN subframe, UE may receive only a control region (Ctrl) of the corresponding subframe, and thus, a relay may configure backhaul link using the data region (Ctrl) of the corresponding subframe.

Carrier Aggregation (CA)

Figure 14:
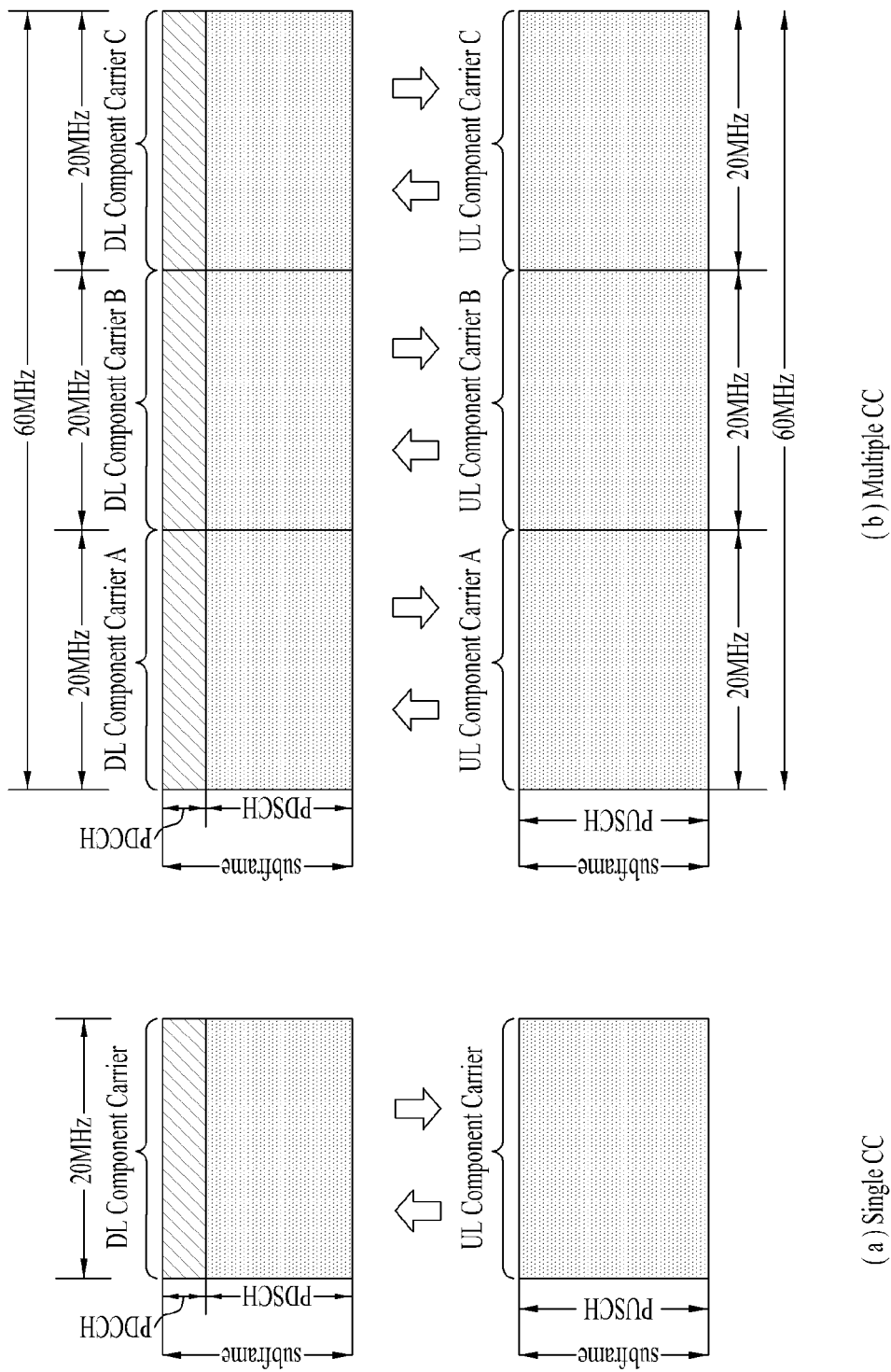
FIG. 14 is a diagram for explanation of carrier aggregation (CA).

FIG. 14 is a diagram for explanation of CA. Prior to a description of CA, concept of a cell introduced to manage wireless resources in LTE-A will be described. The cell may be interpreted as a combination of DL resources and UL resources. Here, the UL resources are not necessary element. Thus, the cell may include DL resources only or DL resources and UL resources. However, this is definition in current LTE-A release 10. In an opposite case, that is, the cell may include UL resources only. A downlink resource may be defined as a downlink component carrier (DL CC) and an uplink resource may be defined as an uplink component carrier (UL CC). The DL CC and the UL CC may be represented using a carrier frequency. The carrier frequency refers to a center frequency at a corresponding cell.

A cell may be classified as a primary cell (Pcell) operating at a primary frequency and a secondary cell (SCell) operating at a secondary frequency. The PCell and the SCell may be collectively referred to as a serving cell. The PCell is used for a UE to establish an initial connection or may be a cell indicated during connection re-establishment or handover. That is, the PCell may be regarded as a central cell associated with control in a CA environment that will be described below. The UE may be allocated PUCCH in a PCell of the UE and may transmit the PUCCH. The SCell may be configured after RRC connection establishment and used to provide additional radio resources. In the CA environment, the remaining serving cells except for the PCell may be regarded as the SCell. Accordingly, if CA has not been configured for a UE in RRC_CONNECTED state or the UE in RRC_CONNECTED state does not support CA, one serving cell including only a PCell exists for the UE. On the other hand, if CA has been configured for a UE in RRC_CONNECTED state, one or more serving cells including a PCell and total SCells exist for the UE. A network may add one or more SCells to a PCell that is initially configured during connection establishment, for a UE supporting CA, after initial security activation is initiated.

Hereinafter, CA will be described with reference to FIG. 14. CA is technology introduced to use a broader band in order to satisfy requirements for a high transmission rate. CA may be defined as aggregation of two or more component carriers (CCs) with different carrier frequencies. Referring to FIG. 14, FIG. 14(a) illustrates a subframe when a conventional LTE system uses one CC and FIG. 14(b) illustrates a subframe when CA is used. FIG. 14(b) illustrates an example in which three CCs at 20 MHz are used to support a total 60 MHz bandwidth. Here, CCs may be contiguous or noncontiguous.

UE may simultaneously receive and monitor DL data through a plurality of DL CCs. A linkage between a DL CC and a UL CC may be indicated by system information. The DL CC/UL CC link may be fixed or semi-statically configured in a system. In addition, although an overall system band includes N CCs, a frequency band for monitoring/receiving of specific UE may be limited to M(<N) CCs. Various parameters associated with CA may be set cell-specifically, UE group-specifically, or UE-specifically.

Figure 15:
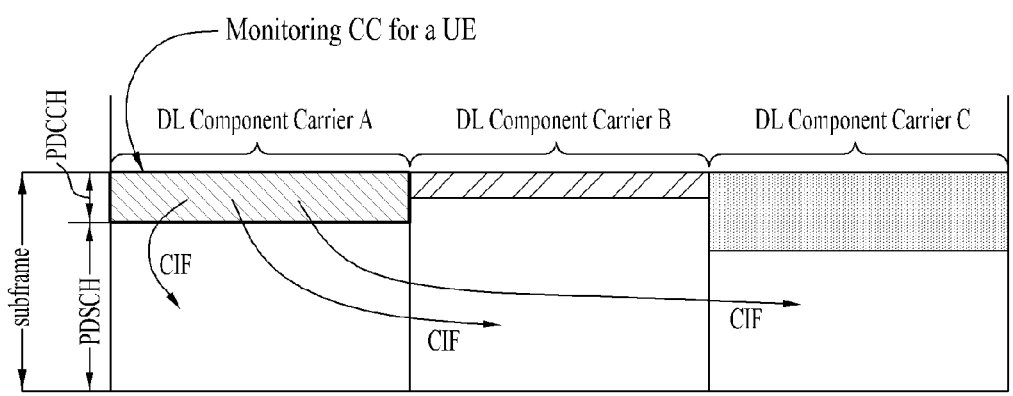
FIG. 15 is a diagram for explanation of cross carrier scheduling.

FIG. 15 is a diagram for explanation of cross carrier scheduling. Cross carrier scheduling is interpreted as, for example, including DL scheduling allocation information of different DL CCs in a control region of one DL CC of a plurality of serving cell or including UL scheduling grant information of a plurality of UL CCs linked with one DL CC in a control region of the DL CC.

First, a carrier indicator field (CIF) will be described.

As described above, the CIF may be included or may not be included in a DCI format transmitted through a PDCCH. In this regard, when the CIF is included in the DCI format, this means that cross carrier scheduling is applied. When the cross carrier scheduling is not applied, DL scheduling allocation information is valid on a DL CC in which DL scheduling allocation information is currently transmitted. In addition, UL scheduling grant is valid on one UL CC linked with a DL CC in which DL scheduling allocation information is transmitted.

When the cross carrier scheduling is applied, a CIF indicates a CC associated with DL scheduling allocation information transmitted through a PDCCH in one DL CC. For example, referring to FIG. 15, DL allocation information regarding a DL CC B and a DL CC C, that is, information regarding PDSCH resources is transmitted through a PDCCH in a control region in a DL CC A. UE may monitor the DL CC A to know a PDSCH resource region and corresponding CC through the CIF.

Whether the CIF is included or not included in the PDCCH may be semi-statically set and the CIF may be enabled UE-specifically via higher layer signaling. When the CIF is disabled, a PDCCH in a specific DL CC may allocate PDSCH resources of the same DL CC and allocate PUSCH resources in a UL CC linked with a specific DL CC. In this case, the same coding method, CCE-based resource mapping, and DCI format as those of a conventional PDCCH structure may be applied.

Meanwhile, when the CIF is enabled, a PDCCH in a specific DL CC may allocate PDSCH/PUSCH resources in one DL/UL CC indicated by the CIF among a plurality of aggregated CCs. In this case, the CIF may be additionally defined in a conventional PDCCH DCI format or may be defined as a fixed field with a length of 3 bits. In addition, a CIF position may be fixed regardless of a DCI format size. In this case, the same coding method, CCE-based resource mapping, and DCI format as those of a conventional PDCCH structure may also be applied.

In the presence of a CIF, a BS may allocate a PDCCH monitoring DL CC set to a UE, thereby reducing blind decoding complexity of the UE. The PDCCH monitoring DL CC set is a part of total aggregated DL CCs. The UE detects/decodes a PDCCH only in the DL CCs of the PDCCH monitoring DL CC set. That is, for PDSCH/PUSCH scheduling for UE, the BS may transmit the PDCCH only on the PDCCH monitoring DL CC set. The PDCCH monitoring DL CC set may be configured UE-specifically, UE group-specifically, or cell-specifically. For example, as illustrated in FIG. 15, when three DL CCs are aggregated, a DL CC A may be set as a PDCCH monitoring DL CC. When a CIF is disabled, a PDCCH on each DL CC may schedule only a PDSCH on DL CC A. Meanwhile, when a CIF is enabled, a PDCCH on a DL CC A may also schedule a PDSCH on another DL CC. When the DL CC A is set as the PDCCH monitoring CC, a PDSCCH is not transmitted to DL CC B and DL CC C.

In a system using the aforementioned CA, UE may receive a plurality of PDSCHs through a plurality of DL carriers. In some cases, the UE may need to transmit ACK/NACKs responding to respective data in one UL CC in one subframe. When a plurality of ACK/NACKs using PUCCH formats 1a/1b are transmitted in one subframe, high transmission power is required and a PAPR of UL transmission is increased. In addition, a transmission available distance of UE from a BS may be reduced due to ineffective use of a transmission power amplifier. In order to transmit a plurality of ACK/NACKs through one PUCCH, ACK/NACK bundling or ACK/NACK multiplexing may be used.

In some cases, ACK/NACK information responding to many DL data due to the use of CA and/or many DL data transmitted in a plurality of DL subframes in a TDD system need to be transmitted through a PUCCH in one subframe. In this case, when a bit number of the ACK/NACK to be transmitted is greater than a bit number that can be supported by ACK/NACK bundling or multiplexing, the ACK/NACK information cannot be properly transmitted using the aforementioned methods.

ACK/NACK Multiplexing Scheme

In case of ACK/NACK multiplexing, contents of ACK/NACK to a plurality of data units may be identified via a combination of an ACK/NACK unit used in actual ACK/NACK transmission and one of QPSK-modulated symbols. For example, it is assumed that one ACK/NACK unit delivers 2 bit information and receives a maximum of 2 data units. Here, it is assumed that an HARQ ACK to each respective data unit may be represented by one ACK/NACK bit. In this case, a transmitter transmitting data may identify the ACK/NACK results as shown in Table 5 below.

TABLE 5

| HARQ-ACK (0), HARQ-ACK (1) | $n_{PUCCH}^{(1)}$ | b(0),b(1) |
|---|---|---|
| ACK, ACK | $n_{PUCCH,1}^{(1)}$ | 1, 1 |
| ACK, NACK/DTX | $n_{PUCCH,0}^{(1)}$ | 0, 1 |
| NACK/DTX, ACK | $n_{PUCCH,1}^{(1)}$ | 0, 0 |
| NACK/DTX, NACK | $n_{PUCCH,1}^{(1)}$ | 1, 0 |
| NACK/DTX | $n_{PUCCH,0}^{(1)}$ | 1, 0 |
| DTX, DTX | N/A | N/A |

In Table 5 above, HARQ-ACK (i) (i=0 and 1) represents ACK/NACK results to a data unit i. As described above, since it is assumed that a maximum of 2 data units (data unit 0 and data unit 1) are received, an ACK/NACK result to the data unit 0 is represented by HARQ-ACK(O) and an ACK/NACK result to the data unit 1 is represented by HARQ-ACK(1), in Table 5 above. In Table 5 above, discontinuous transmission (DTX) indicates that a data unit corresponding to HARQ-ACK(i) is not transmitted or a receiver does not detect presence of a data unit corresponding to HARQ-ACK (i). In addition, $n_{PUCCH,X}^{(1)}$ indicates an ACK/NACK unit that is used for actual ACK/NACK transmission. When a maximum of 2 ACK/NACK units are present, $n_{PUCCH,X}^{(1)}$ may be indicated as $n_{PUCCH,0}^{(0)}$ and $n_{PUCCH,1}^{(1)}$. In addition, b(0) and b(1) indicate two bits transmitted by the selected ACK/NACK unit. A modulation symbol transmitted through the ACK/NACK unit is determined according to bits b(0) and b(1).

For example, when a receiver successfully receives and decodes two data units (i.e., in case of ACK, ACK of Table 5 above), the receiver transmits two bits (1, 1) using a ACK/NACK unit $n_{PUCCH,1}^{(1)}$. When the receiver receives two data units, if the receiver fails in decoding (or detecting) a first data unit (that is, the data unit 0 corresponding to HARQ-ACK(0)) and succeeds in decoding a second data unit (that is, the data unit 1 corresponding to HARQ-ACK (1)) (i.e., in case of NACK/DTX, ACK of Table 5 above), the receiver transmits two bits (0,0) using an ACK/NACK unit $n_{PUCCH,1}^{(1)}$.

Likewise, by linking or mapping a combination of actual bit contents of the selected and transmitted ACK/NACK unit (that is, a combination of selection of one of $n_{PUCCH,0}^{(1)}$ and $n_{PUCCH,1}^{(1)}$ and b(0) and b(1)) with contents of actual ACK/NACK, ACK/NACK information to a plurality of data units may be transmitted using one ACK/NACK unit. By extending the principle of the aforementioned ACK/NACK multiplexing, ACK/NACK multiplexing for two or more data units can be easily implemented.

In the ACK/NACK multiplexing scheme, basically, when at least ACK is present for all data units, NACK and DTX cannot be distinguished (that is, as indicated by NACK/DTX in Table 5 above, NACK and DTX may be coupled). This is because not all ACK/NACK states (that is, ACK/NACK hypotheses) that may be generated in order to separately indicate NACK and DTX cannot be reflected by a combination the ACK/NACK units and the QPSK-modulated symbols. When ACK is not present for all data units (that is, when only NACK or DTX is present for all data units), one distinguishable NACK case indicating that only one of HARQ-ACK(i) is a distinguishable NACK (that is, NACK distinguishable from DTX) may be defined. In this case, an ACK/NACK unit corresponding to a data unit corresponding to one distinguishable NACK may be reserved to transmit a plurality of ACK/NACK signals.

Semi-Persistent Scheduling (SPS)

According to DL/UL SPS, first, UE is allocated subframes in which SPS transmission/reception (TX/RX) is performed (at a subframe period and offset) via signaling during radio resource control (RRC) signaling. In reality, SPS activation and release are performed through a PDCCH. That is, although the UE is allocated SPS via RRC signaling, the UE does not perform SPS TX/RX directly. Instead, when the UE receives a PDCCH (i.e., a PDCCH in which SPS C-RNTI is detected) indicating activation (or reactivation), the UE performs an SPS operation accordingly. That is, when the UE receives the SPS activation PDCCH, the UE may be allocated frequency resources according to RB allocation determined in the PDCCH and may begin TX/RX at the subframe period and offset allocated via the RRC signaling using a modulation and coding rate based on MCS information. When the UE receives a PDCCH indicating SPS release, the UE stops TX/RX. When the UE receives a PDCCH signaling activation (or reactivation), the UE may restart TX/RX at the subframe period and offset allocated via the RRC signaling according to the RB allocation determined in the PDCCH, MCS, and so on.

As a PDCCH format defined in current 3GPP LTE, various formats such as DCI format 0 for UL and DCI formats 1, 1A, 1B, 1C, 1D, 2, 2A, 3, 3A, etc. for DL are defined. In addition, according to the use of the formats, a combination obtained by selecting control information such as information regarding hopping flag, RB allocation, a modulation coding scheme (MCS), a redundancy version (RV), a new data indicator (NDI), transmit power control (TPC), a cyclic shift demodulation reference signal (DMRS), a UL index, channel quality information (CQI) request, a DL assignment index, an HARQ process number, a transmitted precoding matrix indicator (TPMI), precoding matrix indicator (PMI) confirmation, and so on may be transmitted.

In more detail, it may be validated that a PDCCH is used for SPS activation/release when CRC of DCI transmitted through the PDCCH is masked by SPS C-RNTI and NDI=1 is set. In this case, in case of SPS activation, a combination of bit fields is set to 0 and is used as virtual CRC, as shown in Table 6 below.

TABLE 6

|  | DCI format 0 | DCI format 1/1A | DCI format 2/2A/2B |
|---|---|---|---|
| TPC command for scheduled PUSCH | set to '00' | N/A | N/A |
| Cyclic shift DMRS | set to '000' | N/A | N/A |
| Modulation and coding scheme and redundancy version | MSB is set to '0' | N/A | N/A |
| HARQ process number | N/A | FDD: set to '000' TDD: set to '0000' | FDD: set to '000' TDD: set to '0000' |
| Modulation and coding scheme | N/A | MSB is set to '0' | For the enabled transport block: MSB is set to '0' |
| Redundancy version | N/A | set to '00' | For the enabled transport block: set to '00' |

Virtual CRC provides additional error detection capability by checking whether a corresponding bit field value is a given value when errors that cannot be checked via CRC occur. When errors occur in DCI allocated to another UE, if a specific LTE does not detect the corresponding errors and misunderstands the errors as SPS activation of the specific UE, the UE continuously uses corresponding resources, and thus, one time error causes contiguous problems. Thus, due to the use of the virtual CRC, SPS is prevented from being wrongly detected.

In case of SPS release, a bit field value is set and is used as virtual CRS, as shown in Table 7 below.

TABLE 7

|  | DCI format 0 | DCI format 1A |
|---|---|---|
| TPC command for scheduled PUSCH | set to '00' | N/A |
| Cyclic shift DMRS | set to '000' | N/A |
| Modulation and coding scheme and redundancy version | set to '11111' | N/A |
| Resource block assignment and hopping resource allocation | Set to all '1' s | N/A |
| HARQ process number | N/A | FDD: set to '000' TDD: set to '0000' |
| Modulation and coding scheme | N/A | set to '11111' |
| Redundancy version | N/A | set to '00' |
| Resource block assignment | N/A | set to all '1' s |

PUCCH Piggyback

In case of UL transmission, a legacy 3GPP LTE system (for example, release-8 system) maintains single carrier transmission with good peak-to-average power ratio (PAPR) characteristics or good cubic metric (CM) characteristics, which affect performance of a power amplifier, for effectively use the power amplifier of UE. That is, a legacy LTE system may maintain single carrier characteristics of data to be transmitted via DFT-precoding, in case of PUSCH transmission, and maintain single carrier characteristics by delivering information in a sequence having the single carrier characteristics and transmitting the information, in case of PUCCH transmission. However, when the DFT-pre-coded data is discretely allocated in a frequency axis or PUSCH and PUCCH are simultaneously transmitted, the single carrier characteristics are not maintained.

Figure 16:
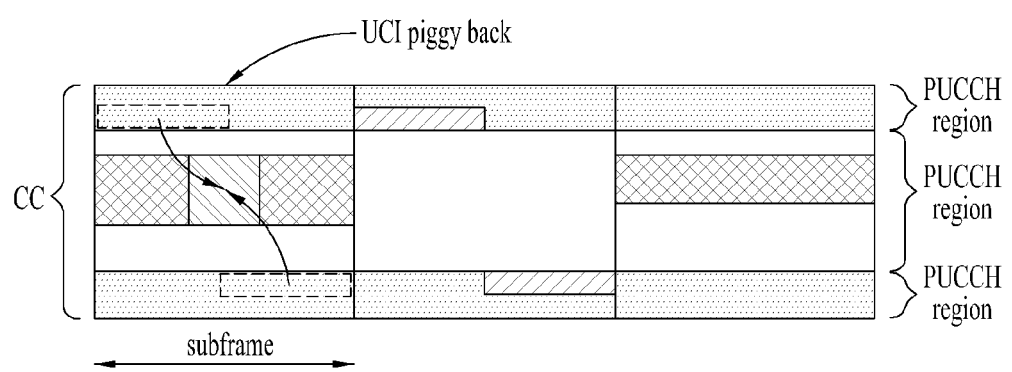
FIG. 16 is a diagram for explanation of a method of transmitting UL control information through a PUCCH.

Thus, as illustrated in FIG. 16, when PUSCH is transmitted in the same subframe as that of PUCCH transmission, uplink control information (UCI) to be transmitted to the PUCCH may be piggyback together with data through the PUSCH in order to maintain the single carrier characteristics.

As described above, since legacy LTE UE cannot simultaneously transmit the PUCCH and the PUSCH, the UE multiplexes UCI (CQI/PMI, HARQ-ACK, RI, etc.) in a the PUSCH region in a subframe in which the PUSCH is transmitted. For example, in order to transmit CQI and/or PMI in a subframe allocated to transmit the PUSCH, UL-SCH data and CQI/PMI may be multiplexed prior to DFT-spread to simultaneously transmit control information and data together. In this case, the UL-SCH data may be rate-matched in consideration of CQI/PMI resources. In addition, control information such as HARQ ACK, RI, etc. may be multiplexed in a PUSCH region by puncturing the UL-SCH data.

Figure 17:
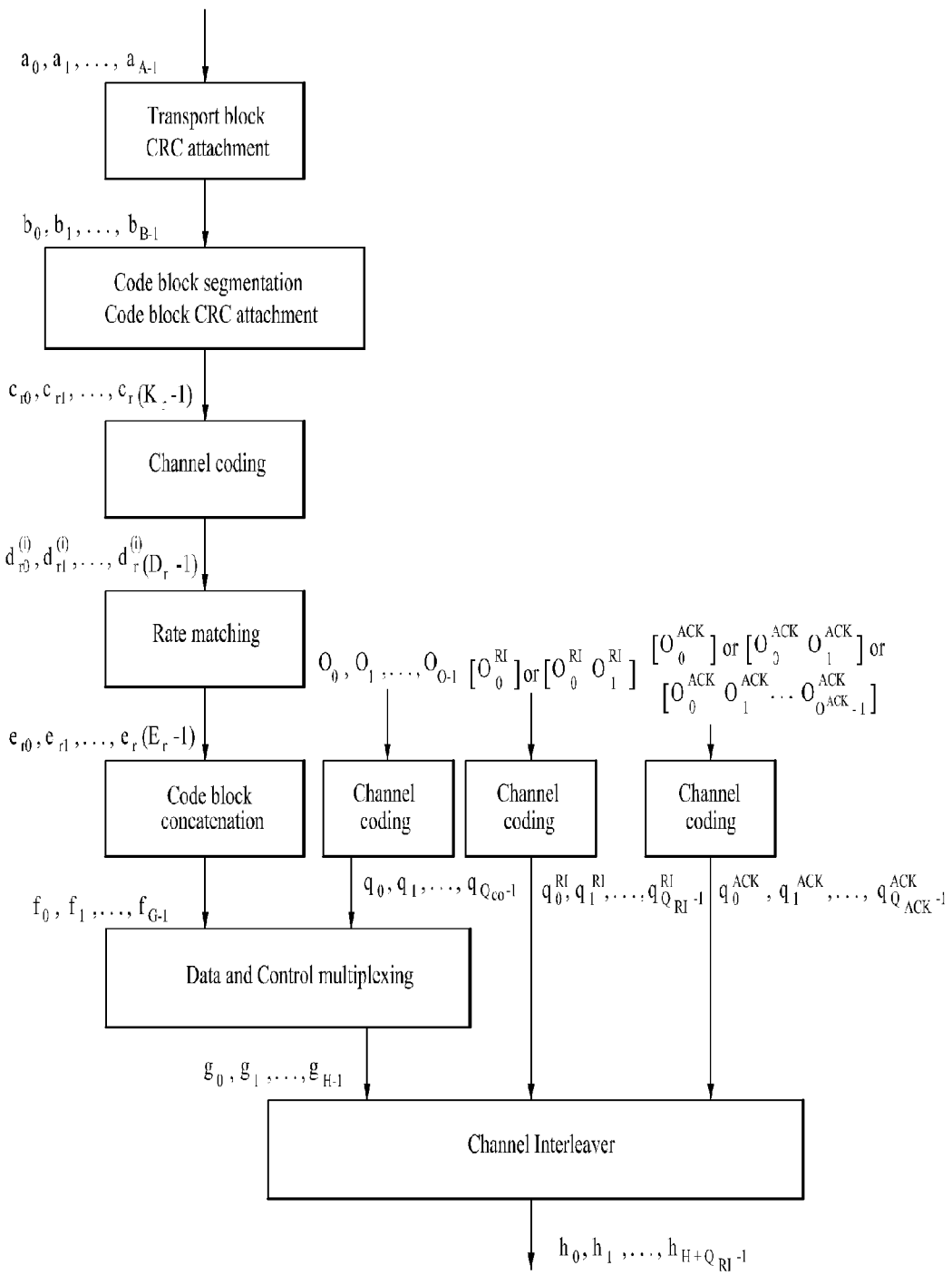
FIG. 17 is a diagram for explanation of multiplexing of UL data and control information.

FIG. 17 is a diagram illustrating a process of multiplexing data and control information for UL transmission.

As illustrated in FIG. 17, with regard to the data information multiplexed together with the control information, cyclic redundancy check (CRC) for a transport block (TB) is added to the TB to be transmitted in UL. Then, the data information is divided into a plurality of code blocks (CBs) according to a TB size and CRC for CB is added to the plural CBs. Channel encoding is performed on the resulting value. In addition, the channel coded data is rate-matched, the CBs are coupled, and then, the coupled CBs are multiplexed together with a control signal.

Meanwhile, CQI/PMI oO, ol, to 00-1 is channel-encoded separately from data. The channel-encoded CQI/PMI and the data are multiplexed. The CQI/PMI information and the multiplexed data are input to a channel interleaver.

Rank information [oORI] or [oORI olRI]) are also channel-encoded separately from data. The channel-encoded tank information is inserted into some of signals interleaved via a process such as puncturing, etc.

ACK/NACK information ([oOACK] or [oO ACK ol ACK] . . . ) is channel-encoded separately from data, CQI/PMI, and rank information. The channel-encoded ACK/NACK information is inserted into some of signals interleaved via a process such as puncturing, etc.

Hereinafter, based on the above description, an eNB system that aggregates different frequency spectrums, frequency bands, or carriers and transmits them to one UE will be described.

Figure 18:
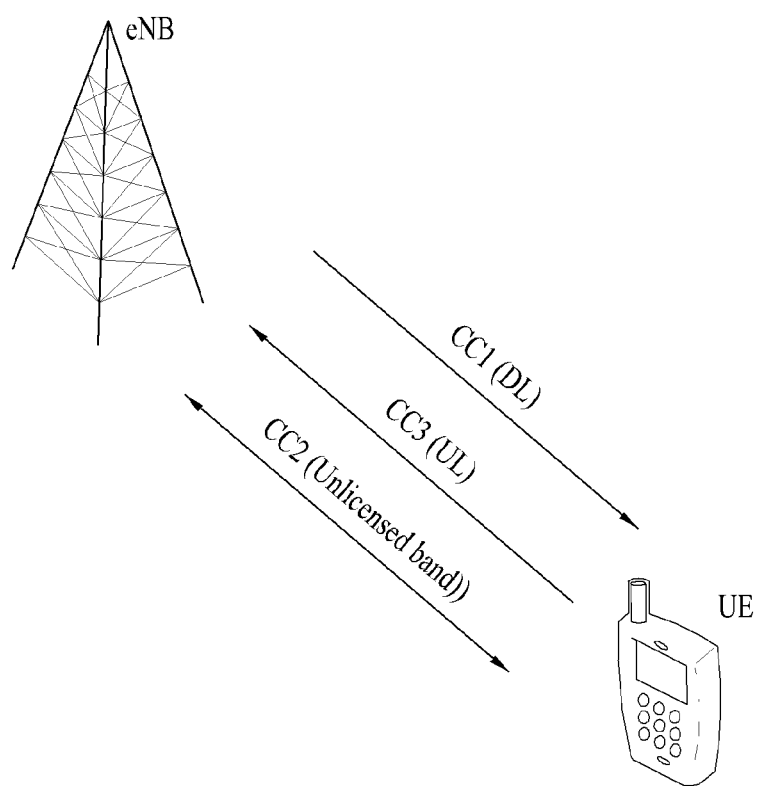
FIG. 18 is a diagram for explanation of a system for CA according to an embodiment of the present invention.

Hereinafter, as illustrated in FIG. 18, for convenience of description, a system using two cells is assumed. In FIG. 18, CC1 and CC3 are component carriers of a Pcell and CC2 is a component carrier of a Scell. It is assumed that the Pcell corresponds to a frequency band as a unique frequency band that LTE/LTE-A uses and the Scell corresponds to an unlicensed band. However, this does not preclude the presence of more Scell (LTE/LTE-A frequency band and/or unlicensed band) in a serving cell.

Figure 19:
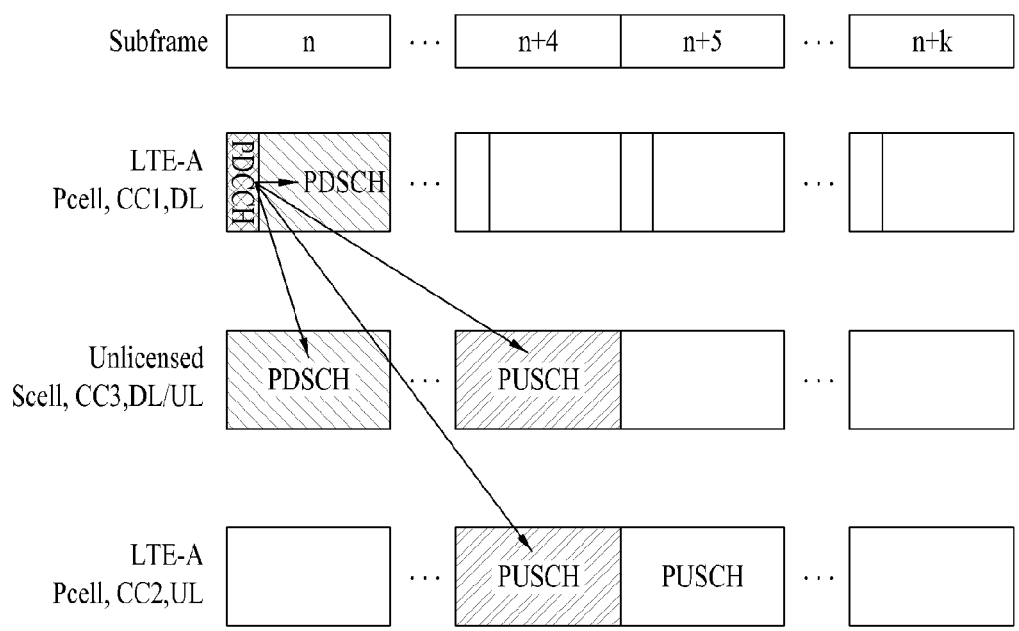
FIG. 19 is a diagram illustrating an example in which cross carrier scheduling is performed in an unlicensed band according to an embodiment of the present invention.

FIG. 19 illustrates an example in which the eNB of FIG. 18 performs cross carrier scheduling in an unlicensed band. That is, the eNB of FIG. 18 may schedule (UL-grant) a PDSCH in an n-th subframe of CC1 and a PUSCH in an (n+4)th subframe of CC2 in an LTE/LTE-A frequency band. In addition, the eNB may schedule (DL-assign) a PDSCH and/or a PUSCH in an (n+4)th subframe of CC3 that is a component carrier in an unlicensed band. In this case, the PDSCH and/or the PUSCH may be indicated by a PDCCH in the CC1 of the Pcell. Here, the PDCCH indicating the PDSCH and/or PUSCH of the CC3 may be the same as or different from in conventional cross carrier scheduling. The present embodiment is different from the conventional cross carrier scheduling in that information contained in a PDCCH for an unlicensed band may be different. For example, only some information is indicated and other fields may be used for other use. That is, DCI format field configuration/structure may be different. This is because scheduling optimized for an unlicensed band if possible is performed using the properties of the unlicensed band. For example, a field to be added may include information such as a carrier sensing position and/or offset, back-off time duration, priority, OFDM and/or OFDM, a subframe length, a subframe type (e.g., a subframe with a variable length or a subframe with a fixed length), and so on.

However, as described above, in order to schedule the PDSCH and/or PUSCH in a component carrier in an unlicensed band, carrier sensing is required. In other words, the CC3 of FIG. 19 is a component carrier in an unlicensed band. In addition, various types of devices can transmit/receive the CC3 in a corresponding band, and thus, it is required to check whether a component carrier desired to be transmitted can be used.

A relationship between cross carrier scheduling and carrier sensing will be described with regard to the following cases. Hereinafter, it is assumed that at least two following cases are considered basically.

As a first method, when carrier sensing is performed and a target unlicensed band is determined to be idle, cross carrier scheduling is performed. That is, UL grant and/or DL grant are performed on the unlicensed band determined to be idle, Scell and CC3 of FIG. 19, and a search space for a PDSCH of CC1, a PDSCH, and/or PUSCH of CC3 are configured in the CC1 of the Pcell.

As a second method, prior to carrier sensing, performing CA and cross carrier scheduling is pre-determined. That is, in FIG. 19, a search space for a PDSCH of the CC1, a PDSCH, and/or PUSCH of CC3 are constituted in the CC1, and carrier sensing is performed in order to transmit the PDSCH and/or the PUSCH in the CC3.

FIG. 20 illustrates an example of a carrier sensing point of time. FIG. 20(a) illustrates an appropriate position of carrier sensing in a method of smoothly performing cross carrier scheduling after carrier sensing. However, in case of carrier sensing after cross carrier scheduling, scheduling is also performed prior to PDCCH transmission, and thus, the carrier sensing may be performed just before a PDSCH transmission subframe.

FIG. 20(b) illustrates a case in which carrier sensing is continuously performed when CC3 is not idle as a result of carrier sensing, and when the carrier sensing is successful, a PDSCH and/or PUSCH are transmitted for 0 or minimum back-off time. In this case, a position of a start/end symbol of the PDSCH and/or PUSCH may be fixed or transmission time duration may be fixed. The back-off time is approximately 0 so as to prevent other UEs or other system UEs from accessing and using the CC3. This is because minimum priority is applied to an LTE/LTE-A system and priority of other parts is lowered, thereby maintaining overall balance. That is, in order to satisfy an LTE/LTE-A transmission unit, special priority is applied. In addition, a process may be further performed to apply predetermined back-off time (e.g., back-off time defined in WIFI) and to transmit special information in order to hold resources during the back-off time.

The carrier sensing position may be predetermined as illustrated in FIG. 20(a). Information regarding the carrier sensing position may be pre-shared by the eNB and the UE. The carrier sensing position may be semi-statically determined and related information may be shared by the eNB and the UE. The carrier sensing position may be indicated in the form of offset. Alternatively, the carrier sensing position may be dynamically indicated to be performed at a predetermined position using a PDCCH. In this case, the PDCCH needs to be detected prior to reception of the PDSCH.

When collision is detected as a carrier sensing result (for example, when it is determined that a licensed device is used), PDSCH transmission scheduled in a component carrier in the unlicensed band may be delayed by as much as predetermined time (back-off time), and as a result, PDSCH transmission start time and PDCCH transmission start time may be different by as much as the back-off time.

As a result of carrier sensing, when there is no collision, both cases in which random back-off is used and fixed back-off is used until a PDSCH is transmitted may be used. That is, in an LTE/LTE-A system is used in an unlicensed band, the same back-off rule as that of WiFi may be used.

However, according to a proposed method, carrier sensing start time (for example, a subframe unit, a slot unit, and a symbol/N unit) may be fixed or PDSCH transmission end time may be fixed, for compatibility with an operation (scheduling) of a subframe unit of LTE/LTE-A. Here, PDSCH transmission end time may be a subframe boundary, a slot boundary, or the like. Alternatively, a method of fixing PDSCH transmission time duration is proposed. For example, the PDSCH transmission time duration may be limited to duration from a transmission start time to a first subframe, a 1 slot, a 1 symbol, an N symbol, and so on.

When PDSCH transmission in the unlicensed band is delayed as a predetermined degree (a subframe, a slot, a symbol, etc.), the following settings may be applied with regard to a pre-transmitted or transmitted PDCCH including scheduling allocation information.

First, when another PDCCH is not received after a pre-received PDCCH value, the existing PDCCH may be still considered as a valid PDCCH.

Second, PDCCH valid time duration is set. When a PDSCH is transmitted after the PDCCH valid time duration, the pre-received PDCCH may not be considered as valid information any more.

Third, a UE receives a PDSCH (for example, the UE detects a signal such as a preamble indicating PDSCH transmission start time), and then, when valid DL allocation is not acquired within a predetermined period of time (for example, during SF when at least a portion of the PDSCH is transmitted), the corresponding PDSCH may be set to be discarded.

This situation mainly corresponds to a case in which PDSCH transmission is delayed in a contention-based transmission system. For example, when a PDSCH valid time window is considered as 1 ms (1 subframe), if the PDSCH is transmitted for a period of time that exceeds 1 ms, the pre-received PDCCH value is discarded. In this case, a PDCCH that is received later may be a valid value. When a component carrier of a Pcell belongs to a TDD system, a PDCCH transmitted in a specific DL subframe may be considered to be valid up to a DL subframe in which next PDCCH transmission is possible.

FIG. 21 is a diagram illustrating a case in which ACK/NACK timing is changed according to PDSCH transmission timing.

As seen from FIG. 21(a), PDSCH transmission is performed within a threshold value (0.5 ms) from start time of a PDCCH transmission subframe (an n-th subframe) indicating the PDSCH, and in this case, ACK/NACK to the PDSCH is transmitted in an (n+4)th subframe. Here, 0.5 ms that is set as the threshold value is an example, and thus, may be changed in consideration of HARQ processing performance, etc. of the UE.

FIG. 21(b) illustrates a case in which a PDSCH is transmitted for a predetermined period of time that exceeds the threshold value. In this case, ACK/NACK transmission timing to the PDSCH may be set as an (n+5)th subframe.

In FIGS. 21(a) and 21(b) illustrates cases in which a length of PDSCH transmission duration of the CC3 is the same as a subframe of a conventional LTE/LTE-A, but the length of the PDSCH transmission duration of the CC3 may be set in a different way. For example, the length of the PDSCH transmission duration of the CC3 may be set to various values such as 1.5 subframes or 2 subframes. However, in this case, also in FIG. 21(a), the ACK/NACK timing may be set to (n+5)th and (n+6)th subframes instead of the (n+4)th subframe in consideration of HARQ processing time and decoding performance of the UE.

Figure 22:
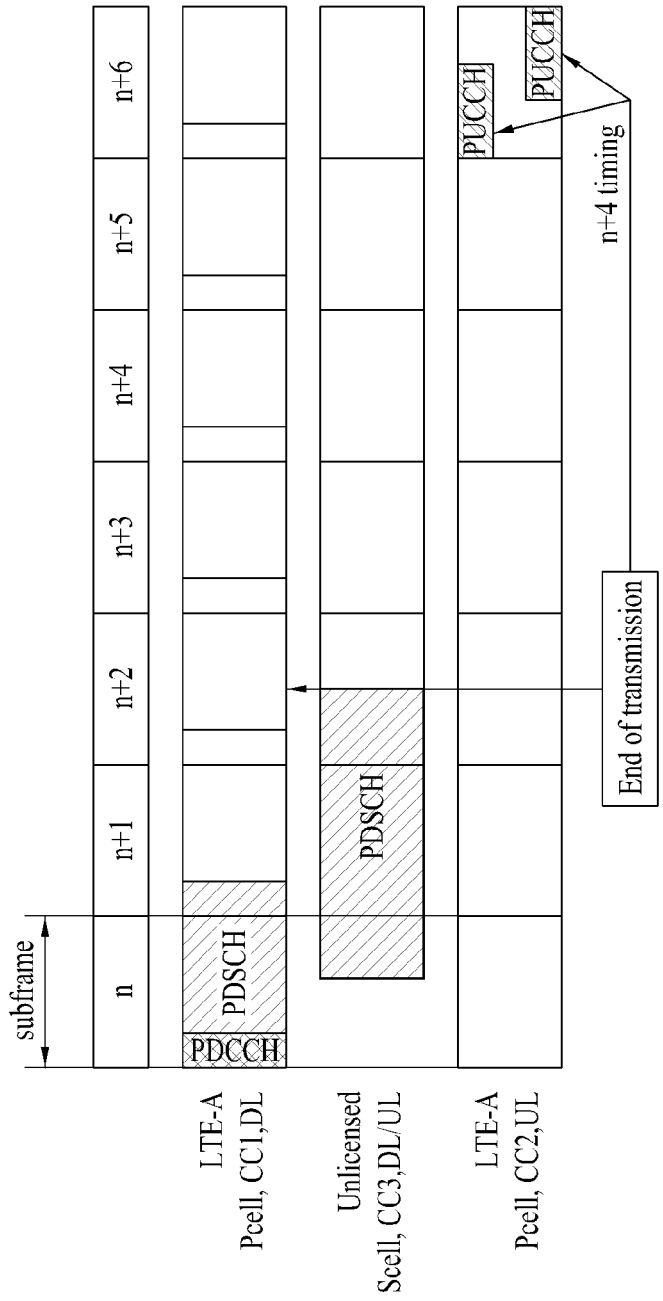
FIG. 22 is a diagram illustrating a case in which ACK/NACK timing is determined according to PDSCH transmission end timing.

FIG. 22 is a diagram illustrating a case in which ACK/NACK timing is determined according to PDSCH transmission end timing. In other words, the ACK/NACK timing may be set such that ACK/NACK is transmitted after a fourth subframe from a subframe in which PDSCH transmission is ended.

Thus far, a method of adjusting ACK/NACK transmission timing according to PDSCH transmission delay has been described. As another method for overcoming problems due to PDSCH transmission delay, PDCCH transmission start time is adjusted instead of an operation dependent upon a PDSCH, and instead, a relationship between a PDCCH transmission start time and ACK/NACK transmission timing is defined. Accordingly, at least, the PDCCH transmission start time and the ACK/NACK transmission timing may maintain the n+4 rule as in the conventional LTE/LTE-A.

Figure 23:
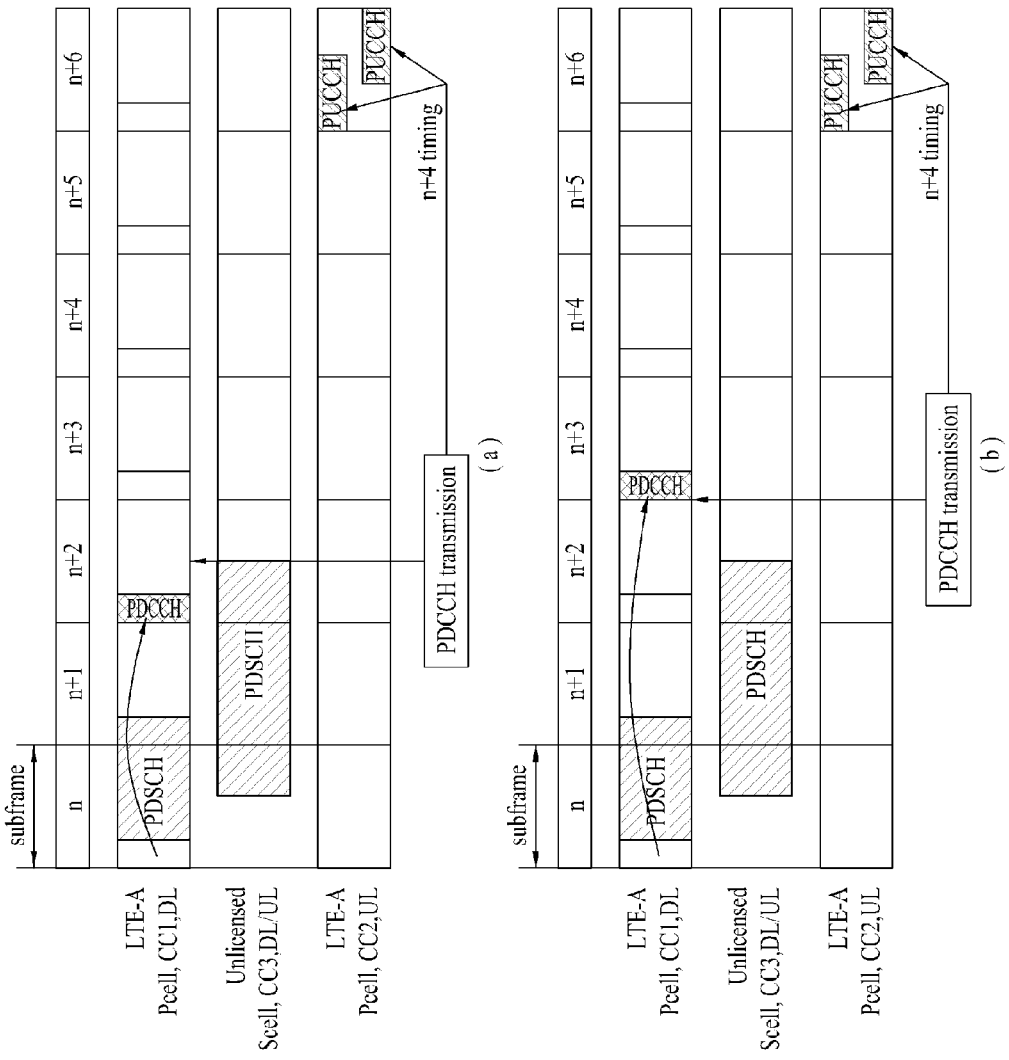
FIG. 23 is a diagram for explanation of PDCCH transmission end time adjustment and ACK/NACK timing based thereon according to an embodiment of the present invention.

For example, even though a PDCCH is transmitted in an n-th subframe and a PDSCH is supposed to be transmitted, if PDSCH transmission begins at an end portion of an n-th subframe across an (n+1) subframe due to the PDSCH transmission delay, the eNB may intentionally set the PDCCH to be transmitted to an (n+1)th subframe or an (n+2)th subframe. In addition, the eNB may set the PDCCH of ACK/NACK to be transmitted to an (n+kl)th (kl is a fixed value) subframe from a subframe in which the PDCCH of the ACK/NACK is transmitted. Here, when kl=4, the conventional n+4 rule may be maintained. Referring to FIG. 23, in FIG. 23(a), a PDCCH is transmitted in an (n+2)th subframe including a point of time when PDSCH transmission of CC3 is ended, and ACK/NACK is transmitted in a subframe ((n+6)th subframe) after a fourth subframe from a subframe in which PDCCH is transmitted. In FIG. 23(b), a PDCCH is transmitted in a subframe subsequent to a subframe in which PDSCH transmission is ended, and ACK/NACK is transmitted after a fourth subframe from the subframe.

Alternatively, the eNB may determine ACK/NACK transmission timing as an n-th subframe in sufficient consideration of time required to receive and decode the PDSCH and transmit a PDCCH in an (n−4)th subframe from the determined n-th subframe. Since the eNB can determine both the PDCCH and the PDSCH, this intentional scheduling is possible. FIG. 23(a) corresponds to an example of the intentional scheduling. A subframe ((n+6)th subframe) for ACK/NACK transmission is predetermined and the PDCCH is transmitted in −4$^{th}$ subframe ((n+2)th subframe) from this subframe.

A relationship between PDCCH transmission timing and ACK/NA'CK timing based thereon may be defined in the following way.

i) A PDCCH is transmitted in a first subframe of the CC1 after PDSCH transmission in the CC3 begins (in case of FIG. 24(a)).

ii) A PDCCH is transmitted in a subframe of the CC1 including a point of time when PDSCH transmission in the CC3 is ended (in case of 24(b)).

iii) A PDCCH is transmitted in a first subframe of the CC1 after PDSCH transmission in the CC3 is ended (in case of FIG. 24(c)).

iv) A PDCCH may be transmitted in a random subframe of the CC1 and a separate indicating field in the PDCCH is prepared to explicitly indicate a point of time when the PDSCH corresponding to scheduling information is transmitted.

With regard to the above PDCCH transmission subframe, ACK/NACK transmission timing may be defined as follows.

i) When a PDCCH is transmitted in a first subframe of the CC1 after PDSCH transmission of the CC3 begins, ACK/NACK is transmitted in a kth subframe after a PDCCH transmission subframe (k=3, 4, 5 . . . ).

ii) When a PDCCH is transmitted in a subframe of the CC1 including a point of time when PDSCH transmission in the CC3 is ended, ACK/NACK is transmitted in a kth subframe after a PDCCH transmission subframe (k=3, 4, 5 . . . ).

iii) When a PDCCH is transmitted in a first subframe of the CC1 after PDSCH transmission in the CC3 is ended, ACK/NACK is transmitted in a kth subframe after a PDCCH transmission subframe (k=3, 4, 5 . . . )

iv) When a PDCCH may be transmitted in a random subframe of the CC1 and a separate indicating field in the PDCCH is prepared to explicitly indicate a point of time when the PDSCH corresponding to scheduling information is transmitted, ACK/NACK is transmitted in a kth subframe after a PDCCH transmission subframe (k=3, 4, 5 . . . ).

v) ACK/NACK is transmitted in a kth subframe after PDSCH transmission end time (k=3, 4, 5 . . . ).

vi) When the length of the PDSCH transmission duration is fixed, ACK/NACK is transmitted in a kth subframe after PDSCH transmission start time (k=3, 4, 5 . . . ). Here, k is selected according to the length of the PDSCH transmission duration.

However, in the aforementioned example of PDCCH transmission timing and ACK/NACK timing based thereon, when the ACK/NACK transmission timing is different from timing defined in the conventional LTE/LTE-A (when k=4 is not satisfied in each example), separate RRC signaling for ACK/NACK resources is required. This is because ACK/NACK resource index in the conventional LTE/LTE-A system is given according to a function of a first CCE index of the PDCCH used to schedule the PDSCH transmission, and thus, ACK/NACK can be used as in the LTE/LTE-A in case of k=4, but separate reservation for ACK/NACK resources is required when k is not 4.

Figure 25:
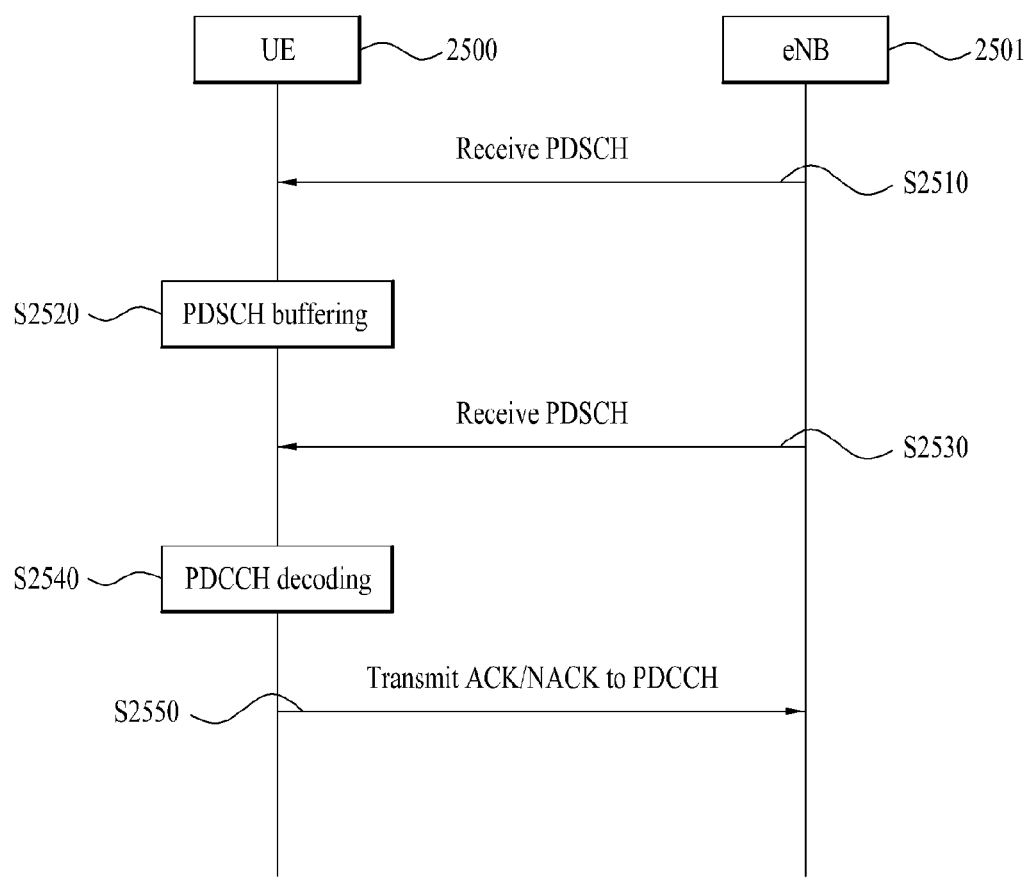
FIG. 25 is a flowchart of operations of user equipment (UE) when PDCCH transmission start time is changed according to an embodiment of the present invention.

As described above, an operation of a UE when the PDCCH transmission timing is changed is illustrated in FIG. 25. A UE 2500 begins to receive a PDSCH through the CC3 (S2510). In this regard, the UE 2500 cannot receive a PDCCH indicating the PDSCH and thus buffers the received PDSCH (S2520). Then, when the UE 2500 receives the PDCCH indicating the PDSCH being buffered through the CC1 (S2530), the UE 2500 acquires frequency resource information allocated to the UE 2500, modulation and coding scheme (MCS) information, HARQ process information, and/or HARQ process ID information and then decodes the buffered PDSCH (S2540). Then, the UE 2500 transmits ACK/NACK to an eNB 2501 according to the aforementioned ACK/NACK timing (S2550).

The UE may trigger ACK/NACK report due to the following reason. When the UE fails in the PDSCH decoding due to insufficient time for decoding, NACK may be transmitted. In addition, a dummy PDCCH may be transmitted to derive ACK/NACK. Here, the dummy PDCCH is not for resource allocation. Instead, the dummy PDCCH is transmitted from the eNB when problems arise with regard to ACK/NACK transmission for pre-transmitted PDCCH and derives the ACK/NACK transmission to check whether the PDSCH transmission is successful or not. That is, the dummy PDCCH refers to a PDCCH, a DCI format of which has a DL allocation format, and to which resources for a PDSCH are not allocated. For example, the eNB can recognize that PDSCH transmission is delayed at the PDCCH transmission start time and thus can predict possibility at which the UE fails in UL ACK/NACK transmission due to insufficient PDSCH decoding time. Thus, in order to provide time for transmission of ACK/NACK after decoding, the UE may transmit the dummy PDCCH. The UE that receives the dummy PDCCH feeds back ACK/NACK information regarding a HARQ process indicated by the corresponding PDCCH. This method may be applied to both TM dependent DCI and fallback mode format such as DCI format 1A. For example, when the DCI format 1A is used, a field configuration is shown in Table 8 below.

TABLE 8

Figure 26:
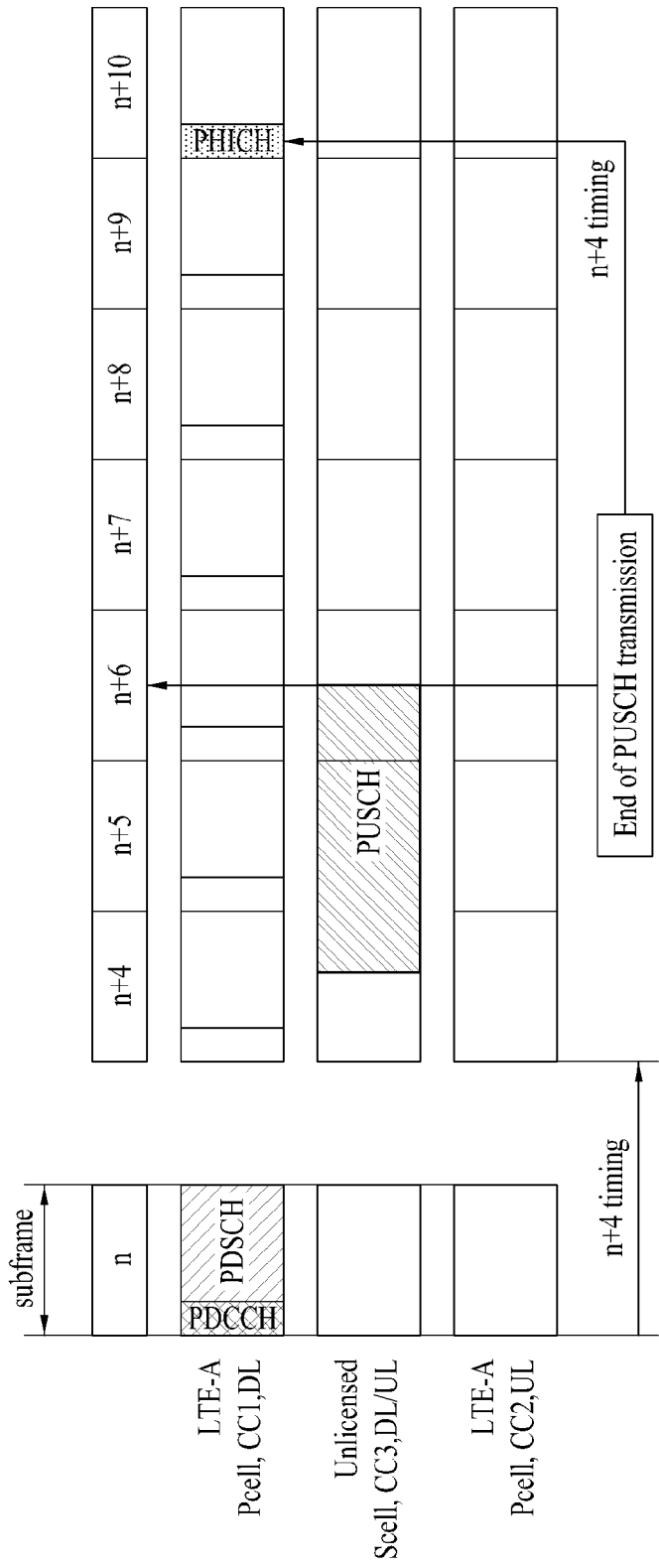
FIG. 26 is a diagram for explanation of a case in which ACK/NACK timing is changed according to PUSCH transmission timing according to an embodiment of the present invention.

Format 1A is used for Dummy PDCCH only if format 1A CRC is scrambled with C-RNTI and all the remaining fields are set as follows:
Localized/Distributed VRB assignment flag - 1 bit is set to '0'
Resource block assignment - $[\log_2(N_{RB}^{DL}(N_{RB}^{DL} + 1)/2)]$ bits, where all bits shall be set to 0
Preamble Index - 6 bits
PRACH Nask Index - 4 bits
All the remaining bits in format 1A for compact scheduling assignment of one PDSCH codeword are set to zero The aforementioned relationship between PDCCH and PDSCH transmission and ACK/NACK transmission may be applied to PDCCH (UL grant) and PUSCH transmission and PHICH in a similar way. For example, referring to FIG. 26, the eNB transmits a PDCCH in an n-th subframe in the CC1 of the CC1 of the Pcell. In this regard, the PDCCH may indicate PUSCH resources across (n+4)th to (n+6)th subframes in the CC3 of the Scell, that is, include UL grant, and ACK/NACK to the received PUSCH may be transmitted in 4th subframes from a subframe including PUSCH transmission end time. The description given with reference to FIGS. 21 to 24 as well as an example illustrated in FIG. 26 may be applied to a timing relationship between the PUSCH and the PHICH and a relationship between PDCCH transmission timing adjustment for scheduling PUSCH transmission and PHICH based thereon.

In addition, the above descriptions may be applied as solutions for scheduling allocation/grant and ACK/NACK transmission timing in all systems in which data transmission start and end times are not fixed and are variable.

Figure 27:
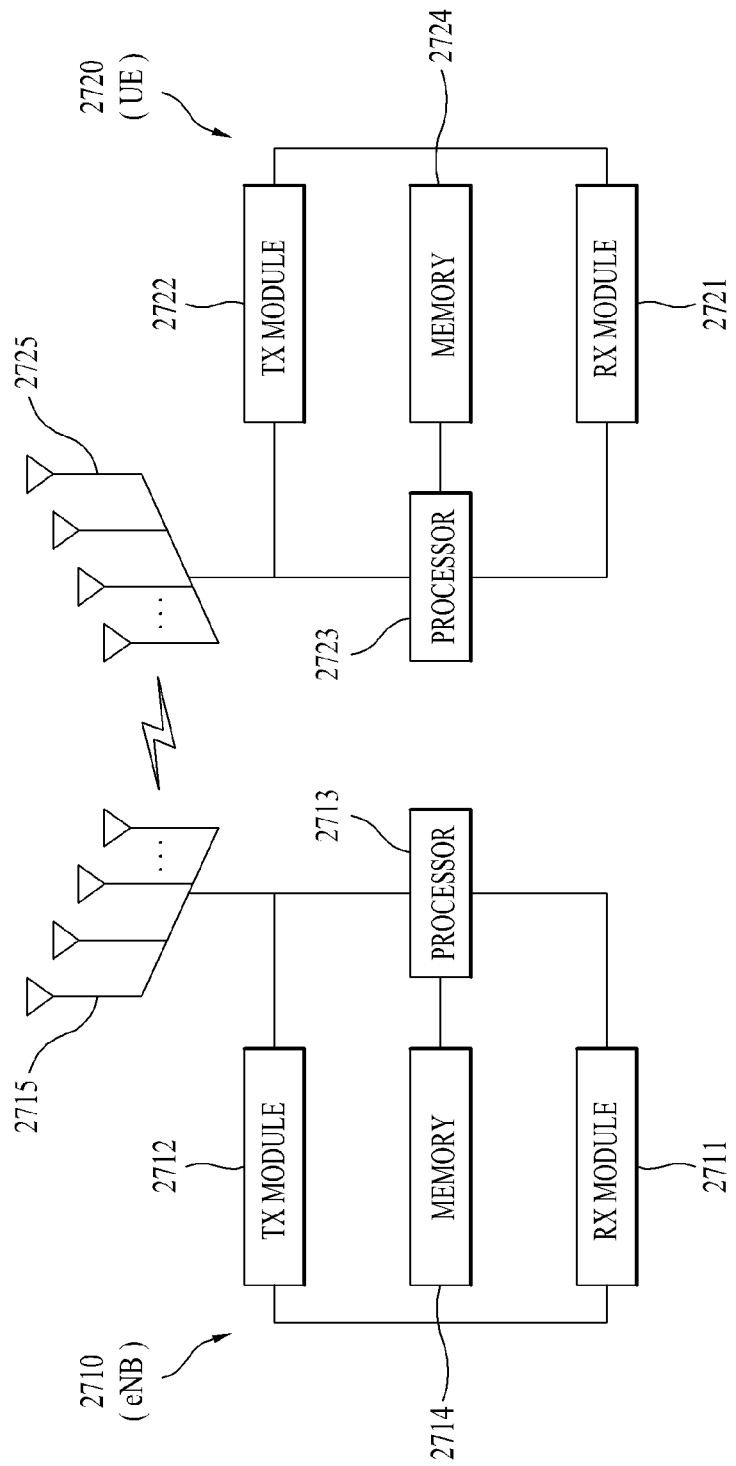
FIG. 27 is a block diagram of a base station (BS) apparatus and a UE apparatus according to an embodiment of the present invention.

FIG. 27 is a block diagram of a BS apparatus 2710 and a UE apparatus according to an embodiment of the present invention.

Referring to FIG. 27, the BS apparatus 2710 may include a reception (Rx) module 2711, a transmission (Tx) module 2712, a processor 2713, a memory 2714, and a plurality of antennas 2715. The plural antennas 2715 indicate a BS apparatus for supporting MIMO transmission and reception. The Rx module 2711 may receive a variety of signals, data and information on an uplink starting from the UE. The Tx module 2712 may transmit a variety of signals, data and information on a downlink for the UE. The processor 2713 may provide overall control to the BS apparatus 2710.

The processor 2713 of the BS apparatus 2710 according to one embodiment of the present invention may transmit a PDSCH in a DL secondary cell and a PDCCH indicating the PDSCH in a DL primary cell to the UE apparatus and receive ACK/NACK to the PDSCH transmitted in an UL primary cell, from the UE apparatus. In this case, the PDSCH may be transmitted from a point of time when the UL secondary cell can be used. Transmission timing of the ACK/NACK may be determined according to any one of the PDSCH transmission timing and the PDCCH transmission timing.

The processor 2713 of the BS apparatus 2710 processes information received from the BS apparatus 2710 and transmission information to be transmitted externally. The memory 2714 may store the processed information for a predetermined time and may be replaced with a component such as a buffer (not shown).

Referring to FIG. 27, the UE apparatus 2720 according to the present embodiment may include a reception (Rx) module 2721, a transmission (Tx) module 2722, a processor 2733, a memory 2724, and a plurality of antennas 2725. The plural antennas 2725 indicate a UE apparatus supporting MIMO transmission and reception. The Rx module 2721 may receive downlink signals, data and information from the BS. The Tx module 2722 may transmit uplink signals, data and information to the BS. The processor 2733 may provide overall control to the UE apparatus 2720.

The processor 2733 of the UE apparatus 2720 according to one embodiment of the present invention may receive a PDSCH in a DL secondary cell and a PDCCH indicating the PDSCH in a DL primary cell and transmit ACK/NACK to the PDSCH in an UL primary cell. In this case, the PDSCH may be transmitted from a point of time when the DL secondary cell can be used. Transmission timing of the ACK/NACK may be determined according to any one of the PDSCH reception timing or the PDCCH reception timing.

The processor 2733 of the UE apparatus 2720 processes information received by the UE apparatus 2720 and transmission information to be transmitted externally. The memory 2724 may store the processed information for a predetermined time and may be replaced with a component such as a buffer (not shown).

The specific configurations of the BE apparatus and the UE apparatus may be implemented such that the various embodiments of the present invention are performed independently or two or more embodiments of the present invention are performed simultaneously. Redundant matters will not be described herein for clarity.

The description of the BS apparatus 2710 shown in FIG. 27 may also be applied to an apparatus acting as a DL transmission entity or UL reception entity and the description of the UE apparatus 2720 may also be applied to a relay apparatus acting as a DL reception entity or UL transmission entity.

The above-described embodiments and modified embodiments may be combined with each other, and thus, may be used alone or in combination thereof, if necessary. The combination may be easily implemented by one of ordinary skill in the art, and thus, a detailed description thereof will not be given here. Although not described, it is to be appreciated that the combination is not precluded, and is within the scope of the invention.

The embodiments of the present invention may be achieved by various means, for example, hardware, firmware, software, or a combination thereof.

In a hardware configuration, an embodiment of the present invention may be achieved by one or more application specific integrated circuits (ASICs), digital signal processors (DSPs), digital signal processing devices (DSDPs), programmable logic devices (PLDs), field programmable gate arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

The detailed description of the preferred embodiments of the present invention is given to enable those skilled in the art to realize and implement the present invention. While the present invention has been described referring to the preferred embodiments of the present invention, those skilled in the art will appreciate that many modifications and changes can be made to the present invention without departing from the spirit and essential characteristics of the present invention. For example, the structures of the above-described embodiments of the present invention can be used in combination. The above embodiments are therefore to be construed in all aspects as illustrative and not restrictive. Therefore, the present invention intends not to limit the embodiments disclosed herein but to give a broadest range matching the principles and new features disclosed herein.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Therefore, the present invention intends not to limit the embodiments disclosed herein but to give a broadest range matching the principles and new features disclosed herein. It is obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

In the above description, the present invention has been described with regard to a $3^{rd}$ generation partnership project (3GPP) long term evolution (LTE) system, but the present invention can be applied to various mobile communication system in the same or equivalent principle.

The invention claimed is:

1. A signal transmitting method of a base station (BS) in a wireless communication system using carrier aggregation (CA), the signal transmitting method comprising:

transmitting a physical downlink shared channel (PDSCH) in a downlink secondary cell and a physical downlink control channel (PDCCH) indicating the PDSCH in a downlink primary cell to a user equipment (UE); and receiving a reception acknowledgement response (ACK/NACK) to the PDSCH, transmitted in an uplink primary cell, from the UE, wherein the PDSCH is transmitted from a point of time when the downlink secondary cell is available, wherein a subframe for the reception ACK/NACK is determined based on a delay time of the PDSCH transmission caused by the downlink secondary cell availability from a start time of a subframe of the PDSCH transmission scheduled by the PDCCH, and wherein when the PDCCH is transmitted in an n-th subframe and the PDSCH is transmitted for a predetermined time that exceeds a preset period of time from a start time of the nth subframe scheduled for the PDSCH, the reception ACK/NACK is transmitted in an (n+5)th subframe.

2. The signal transmitting method according to claim 1, wherein the reception ACK/NACK is transmitted in an (n+4)th subframe when the PDCCH is transmitted in an n-th subframe and the PDSCH is transmitted at a predetermined period of time before a start time of the nth subframe scheduled for the PDSCH.

3. The signal transmitting method according to claim 1, wherein the reception ACK/NACK is transmitted at a fourth subframe after a subframe corresponding to a PDSCH transmission end time when a PDSCH transmission time duration is greater than a subframe in which the PDCCH is transmitted.

4. The signal transmitting method according to claim 1, wherein a point of time when the downlink secondary cell is available is determined as carrier sensing.

5. The signal transmitting method according to claim 1, wherein the PDCCH is transmitted through any one of a first subframe after the PDSCH transmission begins in the downlink primary cell, a subframe in the downlink primary cell corresponding to the PDSCH transmission end time, and a first subframe after the PDSCH transmission is ended in the downlink primary cell.

6. The signal transmitting method according to claim 5, wherein the reception ACK/NACK is received in a k-th subframe after a PDCCH transmission subframe k (k=3, 4, 5).

7. A signal receiving method of a user equipment (UE) in a wireless communication system using carrier aggregation (CA), the signal receiving method comprising:
receiving a physical downlink shared channel (PDSCH) in a downlink secondary cell and a physical downlink control channel (PDCCH) indicating the PDSCH in a downlink primary cell; and
transmitting a reception acknowledgement response (ACK/NACK) to the PDSCH in an uplink primary cell,
wherein the PDSCH is transmitted from a point of time when the downlink secondary cell is available,
wherein a subframe for the reception ACK/NACK is determined based on a delay time of the PDSCH transmission caused by the downlink secondary cell availability from a start time of a subframe of the PDSCH transmission scheduled by the PDCCH, and
wherein when the PDCCH is transmitted in an n-th subframe and the PDSCH is transmitted for a predetermined time that exceeds a preset period of time from a start time of the nth subframe scheduled for the PDSCH, the reception ACK/NACK is transmitted in an (n+5)th subframe.

8. The signal receiving method according to claim 7, wherein the reception ACK/NACK is transmitted at a fourth subframe after a subframe corresponding to a PDSCH reception end time when a PDSCH reception time duration is greater than a subframe in which the PDCCH is received.

9. The signal receiving method according to claim 7, wherein a point of time when the downlink secondary cell is available is determined as carrier sensing.

10. The signal receiving method according to claim 7, wherein the PDCCH is received through any one of a first subframe after the PDSCH transmission begins in the downlink primary cell, a subframe in the downlink primary cell corresponding to the PDSCH transmission end time, and a first subframe after the PDSCH transmission is ended in the downlink primary cell.

11. The signal receiving method according to claim 10, wherein the reception ACK/NACK is transmitted in a kth subframe after a PDCCH transmission subframe k (k=3, 4, 5).

12. A base station (BS) apparatus in a wireless communication system using carrier aggregation (CA), the BS comprising:
a transmission module; and
a processor,
wherein the processor is configured to:
transmit a physical downlink shared channel (PDSCH) in a downlink secondary cell and a physical downlink control channel (PDCCH) indicating the PDSCH in a downlink primary cell to a user equipment (UE), and
receive a reception acknowledgement response (ACK/NACK) to the PDSCH, transmitted in an uplink primary cell, from the UE,
wherein the PDSCH is transmitted from a point of time when the downlink secondary cell is available,
wherein a subframe for the reception ACK/NACK is determined based on a delay time of the PDSCH transmission caused by the downlink secondary cell availability from a start time of a subframe of the PDSCH transmission scheduled by the PDCCH, and
wherein when the PDCCH is transmitted in an n-th subframe and the PDSCH is transmitted for a predetermined time that exceeds a preset period of time from a start time of the nth subframe scheduled for the PDSCH, the reception ACK/NACK is transmitted in an (n+5)th subframe.

13. A user equipment (UE) apparatus in a wireless communication system using carrier aggregation (CA), the UE apparatus comprising:
a reception module; and
a processor,
wherein the processor is configured to:
receive a physical downlink shared channel (PDSCH) in a downlink secondary cell and a physical downlink control channel (PDCCH) indicating the PDSCH in a downlink primary cell, and
transmit a reception acknowledgement response (ACK/NACK) to the PDSCH in an uplink primary cell,
wherein the PDSCH is transmitted from a point of time when the downlink secondary cell is available,
wherein a subframe for the reception ACK/NACK is determined based on a delay time of the PDSCH transmission caused by the downlink secondary cell availability from a start time of a subframe of the PDSCH transmission scheduled by the PDCCH, and
wherein when the PDCCH is transmitted in an n-th subframe and the PDSCH is transmitted for a predetermined time that exceeds a preset period of time from a start time of the nth subframe scheduled for the PDSCH, the reception ACK/NACK is transmitted in an (n+5)th subframe.

* * * * *